(12) United States Patent
Nakagawa

(10) Patent No.: US 8,259,248 B2
(45) Date of Patent: Sep. 4, 2012

(54) ELECTROOPTIC DEVICE AND ELECTRONIC DEVICE

(75) Inventor: Masashi Nakagawa, Chitose (JP)

(73) Assignee: Seiko Epson Corporation, Tokyo (JP)

( * ) Notice: Subject to any disclaimer, the term of this patent is extended or adjusted under 35 U.S.C. 154(b) by 1105 days.

(21) Appl. No.: 11/953,119

(22) Filed: Dec. 10, 2007

(65) Prior Publication Data

US 2008/0143664 A1 Jun. 19, 2008

(30) Foreign Application Priority Data

Dec. 15, 2006 (JP) .................................. 2006-338048
Dec. 15, 2006 (JP) .................................. 2006-338049

(51) Int. Cl.
*G02F 1/136* (2006.01)
(52) U.S. Cl. ................ 349/43; 349/62; 359/17; 359/18; 345/92
(58) Field of Classification Search .................... 349/43; 345/92
See application file for complete search history.

(56) References Cited

U.S. PATENT DOCUMENTS

| 6,417,545 | B1* | 7/2002 | Sakaguchi | 257/368 |
| 2003/0202267 | A1* | 10/2003 | Yamasaki et al. | 359/883 |
| 2004/0119075 | A1* | 6/2004 | Murade | 257/72 |
| 2004/0155992 | A1* | 8/2004 | Choi | 349/43 |
| 2005/0255688 | A1* | 11/2005 | Moriwaki | 438/624 |
| 2006/0098132 | A1* | 5/2006 | Shiota et al. | 349/43 |
| 2006/0286698 | A1* | 12/2006 | Kurashina | 438/29 |
| 2007/0045626 | A1* | 3/2007 | Murade | 257/59 |

FOREIGN PATENT DOCUMENTS

| JP | B2 3356429 | 10/2002 |
| JP | 2005-086003 | * 3/2005 |
| JP | A 2005-086003 | 3/2005 |
| JP | A 2005-115104 | 4/2005 |

* cited by examiner

*Primary Examiner* — Edward Glick
*Assistant Examiner* — Sang Nguyen
(74) *Attorney, Agent, or Firm* — Oliff & Berridge, PLC

(57) ABSTRACT

An electrooptic device includes first insulating layer between a semiconductor layer of a transistor and scanning line. The first insulating layer has a contact hole for electrically connecting the gate electrode and the scanning line, the contact hole having a first portion located beside the semiconductor layer of the corresponding transistor in plan view and that extends in the direction in which one of the scanning lines or the data lines extend and a second portion that overlaps with part of the corresponding data line and that extends in a direction in which the other of the scanning lines data lines extend.

18 Claims, 14 Drawing Sheets

ELECTROOPTIC DEVICE AND ELECTRONIC DEVICE

CROSS-REFERENCE TO RELATED APPLICATION

This application claims foreign priority to Japanese Application No. 2006-338048, filed Dec. 15, 2006, and to Japanese Application No. 2006-338049, filed Dec. 15, 2006, the entireties of which are incorporated herein by reference.

BACKGROUND

1. Technical Field

The present invention relates to the technical field of an electrooptic device such as a liquid crystal device and an electronic device, such as a liquid crystal projector, having the electrooptic device.

2. Related Art

Liquid crystal devices, one of this type of electrooptic device, are frequently used not only for direct-view displays but also for the light modulators (light valves) of, for example, projection display devices. Particularly for projection display devices, strong light from the light source enters the liquid-crystal light valve. Therefore, to prevent the thin-film transistors (TFTs) in the liquid-crystal light valve from increasing in leakage current and malfunctions due to the light, a light-shielding film serving as means for blocking off the incident light is built in the liquid-crystal light valve. For such light-shielding means or light-shielding film, for example, Japanese Patent No. 3356429 discloses a technique for improving the function of shielding TFTs using, of the gate lines higher than the semiconductor layer of the TFTs, the part disposed in a contact hole for connecting the gate lines to a back light-shielding film disposed lower the semiconductor layer.

However, in the technique disclosed in Japanese Patent No. 3356429, the contact hole for connecting the gate lines to the back light-shielding film is rectangular along the data lines in plan view. Therefore, this technique has the technical problem that, as the line width is decreased with an increase in the open area ratio required for this type of electrooptic device, it becomes difficult to provide a sufficient area for the contact hole, resulting in an increase in contact resistance.

This type of electrooptic device is of an active matrix type having, on its substrate, pixel electrodes, and scanning lines, data lines, and TFTs serving as pixel switching elements for selectively driving the pixel electrodes. The electrooptic device may have capacitor elements between the TFTs and pixel electrodes to achieve high contrast. The foregoing components are disposed on the substrate at high density to increase the pixel open area ratio and reduce the device size.

Here, it is desirable that the capacitor elements have the highest possible capacitance; but on the other hand, it is desirable that the pixel open area ratio be not traded off. Accordingly, JP-A-2005-115104 discloses a technique for increasing the capacitance of the capacitor elements while maintaining a high open area ratio by forming the capacitor elements on the bottom and sides of the substrate.

The capacitor elements may be used also for shielding the TFTs by using the electrodes which are components of the capacitor elements. For example, JP-A-2005-115104 discloses a technique for reducing the incident light on the semiconductor layer using the capacitor elements.

However, the technique disclosed in JP-A-2005-115104 has the technical problem of complicating the process of manufacture because the recesses for the capacitor elements must be formed by another process different from the process of forming the other components on the substrate. The technique further has the technical problem that the increase in the open area ratio and the decrease in the device size make it more difficult to provide a sufficient area for capacitor elements.

SUMMARY

An advantage of some aspects of the invention is to provide an electrooptic device in which generation of light leakage current in TFTs can be reduced while the open area ratio is improved and which is capable of achieving good electrical connection between the gate electrodes of the TFTs and the scanning lines disposed in a different layer from the gate electrodes, and an electronic device equipped with the electrooptic device. Another advantage is to provide an electrooptic device having high-capacitance storage capacitors with a high open area ratio so that the generation of a light leakage current in TFTs can be reduced, and capable of displaying high-quality images, and an electronic device having the electrooptic device.

According to a first aspect of the invention, there is provided an electrooptic device including, on the substrate: data lines and scanning lines intersecting each other; pixel electrodes corresponding to the intersections of the data lines and the scanning lines; and transistors disposed in the intersection areas corresponding to the intersections in a non-open area that separates open areas of the pixel electrodes. The transistor includes (i) a semiconductor layer disposed in a layer different from the scanning lines, with a first insulating film therebetween, and having a channel region extending in a first direction in which the data lines extend, and (ii) a gate electrode disposed in a layer opposite to the scanning lines with respect to the semiconductor layer and overlapping with the channel region. The first insulating layer has a contact hole for electrically connecting the gate electrode and the scanning line, the contact hole having, on the substrate in plan view, a first portion extending beside the semiconductor layer in the first direction and a second portion overlapping with part of the scanning line and extending in a second direction in which the scanning line extends.

With the electrooptic device according to the first aspect of the invention, in operation, scanning signals are applied to the gate electrodes of the transistors in sequence through the scanning lines, and image signals are applied to the sources of the transistors through the data lines, and so applied to the pixel electrodes. This allows image display, that is, active matrix display on the pixel regions (also referred to as an image display region) in which pixel electrodes are disposed at the intersections of the data lines and the scanning lines, for example, in matrix form.

The scanning lines, data lines, and transistors are disposed, on the substrate in plan view, in non-open areas that separate the open areas (where the light that is actually used in display is transmitted or reflected) of the pixel electrodes (of the pixels corresponding to the pixel electrodes). Briefly, the scanning lines, data lines, and transistors are disposed in non-open areas not in the open areas of the pixel section. In other words, the scanning lines, data lines, and transistors are disposed in the non-open areas not in the open area of each pixel.

The transistors are disposed in, of the non-open area, the intersection regions corresponding to the intersections of the data lines and the scanning lines (that is, in all or part of the intersection regions). The transistor includes a semiconductor layer having a channel region and a gate electrode overlapping with the channel region.

The semiconductor layer is disposed in a layer different from the scanning lines, with a first insulating film therebetween (that is, lower or higher than the scanning lines with the first insulating film therebetween). The channel region extends in the first direction in which the data lines extend (in other words, in the direction in which the scanning lines are arranged, or in the Y direction). Briefly, the semiconductor layer extends typically in the first direction.

The gate electrodes are, in the layer structure on the substrate, disposed in a layer opposite to the scanning lines with respect to the semiconductor layer. In this case, it is preferable to form a contact hole beside the semiconductor layer to electrically connect the gate electrodes and the scanning lines. That is, in the case where the scanning lines are disposed lower than the semiconductor layer, the gate electrodes are disposed higher than the semiconductor layer, with a gate insulating film therebetween, for example. In other words, the transistors are of a top gate type. In the case where the scanning lines are disposed higher than the semiconductor layer, the gate electrodes are disposed lower than the semiconductor layer, with a gate insulating film therebetween, for example. In other words, the transistors are of a bottom gate type.

The gate electrode and the scanning line are electrically connected via contact holes formed or opened in the insulating film (or the insulating film and the gate insulating film, for example) between the gate electrodes and the scanning lines, in the layer structure on the substrate. That is, in the case where the scanning lines are disposed lower than the semiconductor layer, (that is, when the transistors are disposed higher than the scanning lines, with the first insulating film therebetween, as a top gate type), the gate electrodes are each extended from the portion overlapping with the channel region into the contact hole, so that the gate electrodes and the scanning lines are electrically connected. In the case where the scanning lines are disposed higher than the semiconductor layer (that is, when the transistors are disposed lower than the scanning lines, with the first insulating film therebetween, as a bottom gate type), the scanning lines are each extended from the main portion extending in the second direction into the contact hole, so that the gate electrodes and the scanning lines are electrically connected. In both cases, part of the gate electrode or the scanning line is formed in the contact hole. As an alternative, a conductive plug made of a conductive material different from the gate electrode and the scanning line may be formed in the contact hole so that the gate electrode and the scanning line can be electrically connected.

In this case, the contact hole for electrically connecting the gate electrode and the scanning line has, on the substrate in plan view, a first portion extending beside the semiconductor layer in the first direction and a second portion overlapping with part of the scanning line and extending in a second direction in which the scanning line extends (in other words, a direction intersecting the first direction or the direction in which the data lines are arranged, that is, the X direction). The contact hole is formed in the first insulating film by etching or the like into an L-shaped or T-shaped groove (or a contact groove) constructed of a first portion and a second portion.

This structure can thus reduce the contact resistance between the gate electrode and the scanning line while maintaining a high open area ratio. In this case, since the contact hole has the first and second portions, the area of the contact hole in the limited non-open area can be larger than the case where the contact hole has a typical shape in plan view, such as a circle, square, or rectangle. Thus, the open area ratio can be increased while reducing the electrical resistance between the gate electrode and the scanning line. The "open area ratio" means the ratio of the open area to all the pixel area (the sum of the open area and the non-open area). The display performance of liquid crystal devices increases as the open area ratio increases.

In this case, as described above, the first portion of the contact hole extends beside the semiconductor layer in the first direction. More specifically, the first portion extends longitudinally in the first direction, along the side of the semiconductor layer which extends in the first direction, with a predetermined distance apart therefrom. Thus, part of the gate electrode or the scanning line formed in the first portion is formed as a wall-like light shield extending along the semiconductor layer, as viewed in three dimensions. Thus, the light incident at an angle on the semiconductor layer (that is, the light having a component along the substrate surface) can be blocked off by the first portion (more accurately, part of the gate electrode or the scanning line formed in the first portion). That is, the effect of blocking off the light that comes at an angle in the semiconductor layer can be increased by the first portion formed as a wall-like light shield disposed near the semiconductor layer. Thus, the flickering and pixel-to-pixel variations in image display can be reduced.

As described above, with the electrooptic device according to first aspect of the invention, the contact hole for electrically connecting the scanning line and the gate electrode has the first and second portions. This is suitable for increasing the open area ratio, and can reduce the generation of light leakage current in the transistor and achieve a good electrical connection between the gate electrode of the transistor and the scanning line. This allows high-quality image display with little flickering and pixel-to-pixel variations.

In the electrooptic device according to the first aspect of the invention, it is preferable that the gate electrode have a main portion overlapping with the channel region and a gate-electrode extending portion extending so as to overlap with the contact hole, on the substrate in plan view; and the scanning line have a main line extending in the second direction and a scanning-line extending portion extending so as to overlap with the first portion on the substrate in plan view.

With this structure, the gate-electrode extending portion or the scanning-line extending portion can be formed in the contact hole. Therefore, the gate electrode and the scanning line can be electrically connected with certainty, and the light shielding effect on the semiconductor layer can be improved.

In the electrooptic device according to the first aspect, it is preferable that the semiconductor layer have a data-line-side source drain region that is electrically connected to the data line, a pixel-electrode-side source drain region that is electrically connected to the pixel electrode, a first junction region formed between the channel region and the data-line-side source drain region, and a second junction region formed between the channel region and the pixel-electrode-side source drain region; and the first portion be formed along at least one of the first and second junction regions.

With this structure, the first portion (more accurately, part of the gate electrode or the scanning line formed in the first portion) is formed as, for example, a wall-like light shield extending along at least one of the first and second junction regions of the semiconductor layer, as viewed in three dimensions. Thus, the light incident at an angle on at least one of the first and second junction regions of the semiconductor layer can be blocked off by the first portion. That is, the effect of blocking off the light that comes at an angle in the semiconductor layer can be increased by the first portion formed as a wall-like light shield disposed near the semiconductor layer.

The "first junction region" of the invention is a region formed in the junction between the channel region and the data-line-side source drain region. The "second junction region" of the invention is a region formed in the junction between the channel region and the pixel-electrode-side source drain region. In other words, the first and second junction regions are a PN junction region in the case where the transistor is an NPN type or PNP type transistor (an N channel type or P channel type transistor) or a lightly doped drain (LDD) region (the region of a semiconductor layer doped with less impurities than for the source drain region by ion implantation or the like) in the case where the transistor has an LDD structure.

With the structure in which the first portion is formed along at least one of the first and second junction regions, the contact hole may be formed on both sides of the semiconductor layer, on the substrate in plan view; and the first portion may be provided on both sides of at least one of the first and second junction regions.

In this case, the first portion of the contact hole (more accurately, part of the gate electrode or the scanning line formed in the first portion) is formed as a wall-like light shield on both sides of at least one of the first and second junction regions of the semiconductor layer. This structure can block off the light that comes from both sides at an angle in at least one of the junction regions, thereby reducing light leakage current in the transistor more reliably.

Since the contact hole is formed on both sides of the semiconductor layer, the electrical resistance between the gate electrode and the scanning line can be reduced more reliably.

With the structure in which the first portion is formed along at least one of the first and second junction regions, the first portion may be provided along the second junction region, on the substrate in plan view.

In this case, the first portion of the contact hole (more accurately, part of the gate electrode or the scanning line formed in the first portion) is formed along the second junction region as a wall-like light shield. The inventor has found that the second junction region theoretically has a tendency to generate a light leakage current more than the first junction region while the transistor is on, which was proved by experiment. This structure can reduce the amount of light incident on the second junction region of the semiconductor layer by blocking it by the first portion of the contact hole, thereby reducing the generation of light leakage current of the transistor more effectively.

With the structure in which the first portion is formed along at least one of the first and second junction regions, the first and second junction regions may be LDD regions.

In this case, the transistor has an LDD structure. Thus, the device can reduce OFF-current flowing through the data-line-side source drain region and the pixel-electrode-side source drain region while the transistor is off, reduce a reduction in electric field at the drain end while the transistors is in saturated operation, thereby preventing a decrease in ON-current and an increase in OFF-leak current caused by an increase in threshold due to a hot carrier phenomenon (problems in the reliability of the deterioration of transistor characteristics).

In the electrooptic device according to the first aspect, it is preferable that the scanning lines be disposed lower than the semiconductor layer.

With this structure, the scanning lines are disposed lower than that of a top-gate type transistor, with the first insulating film therebetween. The scanning lines can thus serve as a lower-light shielding film or a back light-shielding film for shielding the transistor from return light. That is, the scanning lines serving as a lower light-shielding film can shield the transistor from the return light from the substrate and the light emitted from another electrooptic device such as a double plate projector and passing through a combining system. This structure can thus reduce the generation of light leakage current in the transistor more reliably.

In the electrooptic device according to the first aspect, it is preferable that the gate electrodes and the scanning lines contain a light-shielding conductive material.

This structure ensures that the gate electrodes and the scanning lines can be used as light-shielding film for blocking off the light incident on the transistors. Particularly, this structure ensures that part of the gate electrodes or the scanning lines can be used as a wall-like light shield formed in the first portion of the contact hole, thereby reducing the generation of light leakage current in the transistors.

In the electrooptic device according to the first aspect, it is preferable that the first portion be smaller in width than the second portion.

With this structure, the width of the first portion is smaller than the width of the second portion. This substantially prevents an increase in non-open area ratio (or a decrease in open area ratio) because of the first portion. Furthermore, since the width of the second portion is larger than the width of the first portion, the contact resistance between the gate electrode and the scanning line can be surely reduced by the second portion. That is, this structure can increase the light shielding effect on the TFT mainly by the first portion while maintaining a high open area ratio and reduce the contact resistance between the gate electrode and the scanning line mainly by the second portion.

In the electrooptic device according to the first aspect, it is preferable that the electrooptic device further include a storage capacitor disposed higher than the transistor, with a second insulating film therebetween, and formed in the non-open area; and the storage capacitor be formed so as to cover a recess that is formed on the upper surface of the second insulating film because of the contact hole, and has a recessed portion having a recessed cross section along the surface of the recess.

With this structure, the storage capacitor is disposed higher than the transistors, with the second insulating film therebetween in the layer structure on the substrate. Furthermore, the storage capacitor is formed in the non-open area so as to overlap with at least part of the semiconductor layer, on the substrate in plan view, typically, so as to overlap with the channel region and the LDD region next thereto. The storage capacitor typically includes a light-shielding conductive film (more specifically, at least one of a pair of capacitor electrodes of the storage capacitor is formed of a light-shielding conductive film such as metal film), so that it works as a built-in light-shielding film for blocking off the light that comes in the transistor from above, thereby reducing the generation of light leakage current in the transistor.

In this case, the storage capacitor is formed so as to cover a recess that is formed on the upper surface of the second insulating film because of the contact hole, and has a recessed portion having a recessed cross section along the surface of the recess.

Specifically, the first insulating film disposed lower than the second insulating film has a contact hole, as described above. Therefore, the upper surface of the second insulating film is recessed substantially along the inside wall of the contact hole. The storage capacitor is formed so as to cover the recess, so that part of which is formed in the recess to form a recessed portion having a recessed cross section along the surface of the recess. The recessed portion is typically formed along the wall and bottom of the recess.

Thus, the storage capacitor 70 increases in capacitance by the amount corresponding to the recessed portion. This increases the potential holding characteristic of the pixel electrode. In other words, the storage capacitor that has the capacitance to achieve the display performance required for the product can be formed in an narrow area on the substrate, as compared with a case in which the storage capacitor has no recessed portion (that is, the storage capacitor has only a flat portion). This can reduce flickering and pixel-to-pixel variations in displaying images, and decrease device size.

Furthermore, the recess (and the recessed portion) have substantially the same shape in plan view as the contact hole because the recess is formed because of the contact hole. In other words, the recessed portion has a portion extending in the Y direction beside the semiconductor layer and a portion overlapping with part of the scanning line and extending in the second direction in which the scanning line extends, on the substrate in plan view. This facilitates forming the recessed portion in the non-open area and can increase the capacitance of the storage capacitor almost without a decrease in open area ratio.

In addition, since the recess is caused by the contact hole, complication or increase of the manufacturing process can be substantially prevented.

Thus, this structure can increase the capacitance of the storage capacitor and reduce light leakage current in TFTs, while maintaining a high open area ratio. This allows high-quality image display.

With the structure including the storage capacitor, the semiconductor layer may have a data-line-side source drain region that is electrically connected to the data line, a pixel-electrode-side source drain region that is electrically connected to the pixel electrode, a first junction region formed between the channel region and the data-line-side source drain region, and a second junction region formed between the channel region and the pixel-electrode-side source drain region; and the storage capacitor may overlap with at least the second junction region, on the substrate in plan view.

In this case, the second junction region which is more prone to light leakage current than the first junction region can be shielded more reliably. Thus, the generation of light leakage current in the transistors can be reduced more effectively.

With the structure including the storage capacitor, the storage capacitor may contain a light-shielding conductive material.

In this case, the storage capacitor can be used as a light shield for shielding the transistors from incident light.

With the structure in which the storage capacitor overlaps with at least the second junction region, the storage capacitor may extend in the first direction and have a first capacitor portion covering the first junction region and a second capacitor portion covering the second junction region and being wider in the second direction than the first capacitor portion.

In this case, the second capacitor portion of the storage capacitor for covering the second junction region is formed to be larger in width in the second direction than the first capacitor portion for covering the first junction region. That is, the second capacitor portion is formed to be larger in width in the X direction than the first capacitor portion. Thus, the light incident on the second junction region which is more prone to light leakage current than the first junction region can be blocked more than the light incident on the first junction region. Briefly, the light-shielding effect on the second junction region can be made higher than that for the first junction region.

According to a second aspect of the invention, there is provided an electrooptic device including, on the substrate: data lines and scanning lines intersecting each other; pixel electrodes corresponding to the intersections of the data lines and the scanning lines; and transistors disposed in the intersection areas corresponding to the intersections in a non-open area that separates open areas of the pixel electrodes. The transistor includes (i) a semiconductor layer disposed in a layer different from the scanning lines, with a first insulating film therebetween, and having a channel region extending in the direction in which the scanning lines extend, and (ii) a gate electrode disposed in a layer opposite to the scanning lines with respect to the semiconductor layer and overlapping with the channel region, the first insulating layer has a contact hole for electrically connecting the gate electrode and the scanning line, the contact hole having, on the substrate in plan view, a first portion extending beside the semiconductor layer in the direction in which the scanning lines extend and a second portion overlapping with part of the data line and extending in the direction in which the data line extends.

With the electrooptic device according to the second aspect of the invention, in operation, image display on the pixel regions can be achieved in substantially the same manner as the electrooptic device according to the first aspect of the invention.

The transistors are disposed in, of the non-open area, the intersection regions corresponding to the intersections of the data lines and the scanning lines (that is, in all or part of the intersection regions). The transistor includes a semiconductor layer having a channel region and a gate electrode overlapping with the channel region.

The semiconductor layer is disposed in a layer different from the scanning lines, with a first insulating film therebetween (that is, lower or higher than the scanning lines with the first insulating film therebetween). The channel region extends in the direction in which the scanning lines extend, (in other words, in the direction in which the data lines are arranged, or in the X direction). Briefly, the semiconductor layer extends typically in the direction of the scanning lines.

The gate electrodes are, in the layer structure on the substrate, disposed in a layer opposite to the scanning lines with respect to the semiconductor layer. In this case, it is preferable to provide a contact hole beside the semiconductor layer to electrically connect the gate electrodes and the scanning lines.

The gate electrode and the scanning line are electrically connected via contact holes formed or opened in the insulating film (or the insulating film and the gate insulating film, for example) between the gate electrodes and the scanning lines, in the layer structure on the substrate.

In this case, the contact hole for electrically connecting the gate electrode and the scanning line has, on the substrate in plan view, a first portion extending beside the semiconductor layer in the direction in which the scanning line extends and a second portion overlapping with part of the data line and extending in the direction in which the data line extends (in other words, in the direction in which the data lines are arranged, that is, in the Y direction). The contact hole is formed in the first insulating film by etching or the like into an L-shaped or T-shaped groove (or a contact groove) constructed of a first portion and a second portion.

This structure can thus reduce the contact resistance between the gate electrode and the scanning line while maintaining a high open area ratio. In this case, since the contact hole has the first and second portions, the area of the contact hole in the limited non-open area can be larger than the case where the contact hole has a typical shape in plan view, such as a circle, square, or rectangle. Thus, the open area ratio can be increased while reducing the electrical resistance between the gate electrode and the scanning line.

In this case, as described above, the first portion of the contact hole extends beside the semiconductor layer in the direction in which the scanning line extends. More specifically, the first portion extends longitudinally in the direction of the scanning line, along the side of the semiconductor layer which extends in the direction of the scanning line, with a predetermined distance apart therefrom. Thus, part of the gate electrode or the scanning line formed in the first portion is formed as a wall-like light shield extending along the semiconductor layer, as viewed in three dimensions. Thus, the light incident at an angle on the semiconductor layer (that is, the light having a component along the substrate surface) can be blocked off by the first portion (more accurately, part of the gate electrode or the scanning line formed in the first portion). That is, the effect of blocking off the light that comes at an angle in the semiconductor layer can be increased by the first portion formed as a wall-like light shield disposed near the semiconductor layer. Thus, the flickering and pixel-to-pixel variations in image display can be reduced.

As described above, with the electrooptic device according to second aspect of the invention, the contact hole for electrically connecting the scanning line and the gate electrode has the first and second portions. This is suitable for increasing the open area ratio, and can reduce the generation of light leakage current in the transistor and achieve a good electrical connection between the gate electrode of the transistor and the scanning line. This allows high-quality image display with little flickering and pixel-to-pixel variations.

In the electrooptic device according to the second aspect, it is preferable that the electrooptic device further include a storage capacitor disposed higher than the transistor with a second insulating film therebetween, and formed in the non-open area; and the storage capacitor be formed so as to cover a recess that is formed on the upper surface of the second insulating film because of the contact hole, and has a recessed portion having a recessed cross section along the surface of the recess.

With this structure, the storage capacitor is disposed higher than the transistors, with the second insulating film therebetween in the layer structure on the substrate. Furthermore, the storage capacitor is formed in the non-open area so as to overlap with at least part of the semiconductor layer, on the substrate in plan view, typically, so as to overlap with the channel region and the LDD region next, thereto. The storage capacitor typically includes a light-shielding conductive film, so that it works as a built-in light-shielding film for blocking off the light that comes in the transistor from above, thereby reducing the generation of light leakage current in the transistor.

In this case, the storage capacitor is formed so as to cover a recess that is formed on the upper surface of the second insulating film because of the contact hole, and has a recessed portion having a recessed cross section along the surface of the recess.

Specifically, the first insulating film disposed lower than the second insulating film has a contact hole, as described above. Therefore, the upper surface of the second insulating film is recessed substantially along the inside wall of the contact hole. The storage capacitor is formed so as to cover the recess, so that part of which is formed in the recess to form a recessed portion having a recessed cross section along the surface of the recess. The recessed portion is typically formed along the wall and bottom of the recess.

Thus, the storage capacitor 70 increases in capacitance by the amount corresponding to the recessed portion. This increases the potential holding characteristic of the pixel electrode. In other words, the storage capacitor that has the capacitance to achieve the display performance required for the product can be formed in an narrow area on the substrate, as compared with a case in which the storage capacitor has no recessed portion (that is, the storage capacitor has only a flat portion). This can reduce flickering and pixel-to-pixel variations in displaying images, and decrease device size.

Furthermore, the recess (and the recessed portion) have substantially the same shape in plan view as the contact hole because the recess is formed because of the contact hole. In other words, the recessed portion has a portion extending in the direction in which the scanning line extends beside the semiconductor layer and a portion overlapping with part of the data line and extending in the direction in which the data line extends, on the substrate in plan view. This facilitates forming the recessed portion in the non-open area and can increase the capacitance of the storage capacitor almost without a decrease in open area ratio.

In addition, since the recess is caused by the contact hole, complication or increase of the manufacturing process can be substantially prevented.

Thus, this structure can increase the capacitance of the storage capacitor and reduce light leakage current in TFTs, while maintaining a high open area ratio. This allows high-quality image display.

According to a third aspect of the invention, there is provided an electronic device including the electrooptic device according to the first aspect of the invention.

Since the electronic device according to the third aspect is equipped with the electrooptic device according to the first aspect, it can be applied to various electronic devices such as projection display devices, portable phones, electronic notebooks, word processors, viewfinder or monitor-direct-view type videotape recorders, workstations, TV phones, POS terminals, and devices having a touch panel. The electronic device can also be applied to electrophoretic devices such as electronic paper.

These and other characteristics, advantages, and features of the invention will become more apparent upon a reading of the following detailed description of the preferred embodiments of the invention with reference to the accompanying drawings.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be described with reference to the drawings. In the following embodiments, a driving-circuit built-in TFT active matrix liquid-crystal device, one example of an electrooptic device of the invention, will be described by way of example.

First Embodiment

A first embodiment will be described with reference to FIGS. 1 to 9.

First, the overall structure of a liquid crystal device according to this embodiment will be described with reference to FIGS. 1 and 2.

Figure 1:
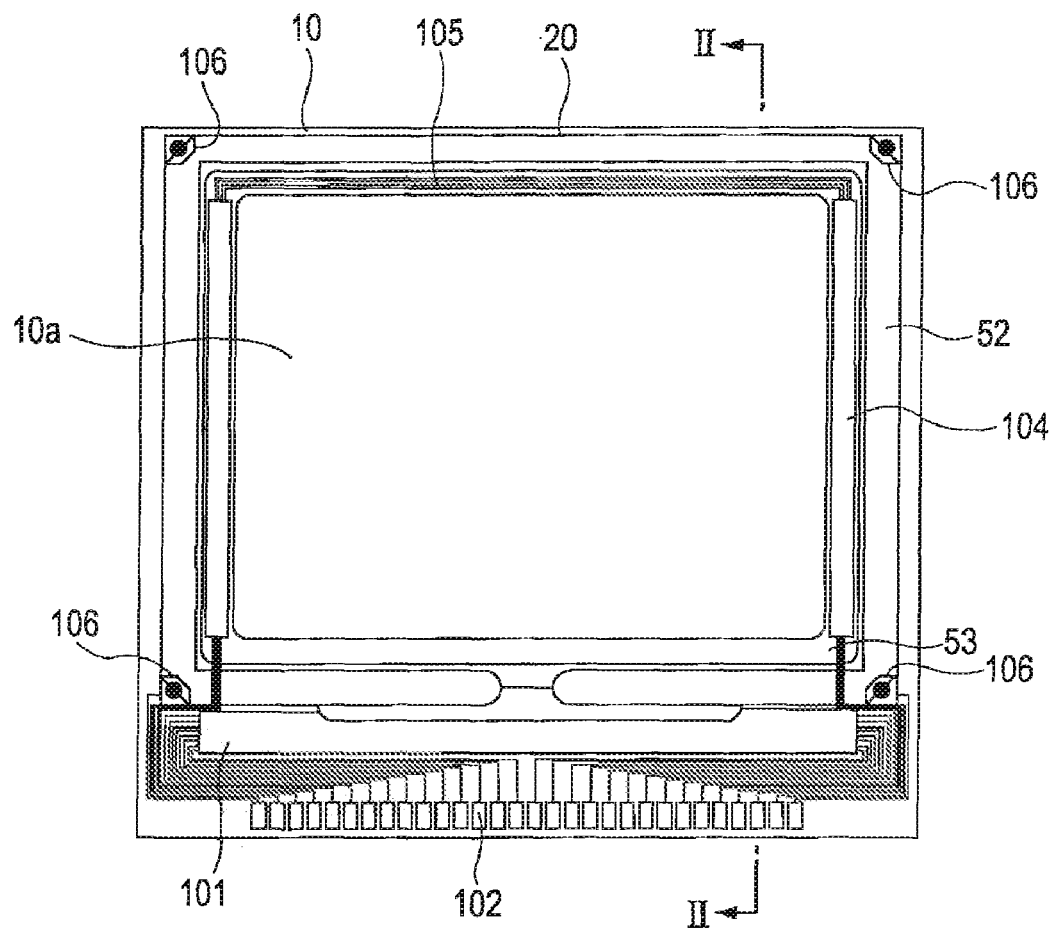
FIG. 1 is a plan view showing the overall structure of a liquid crystal device according to a first embodiment.
Figure 2:
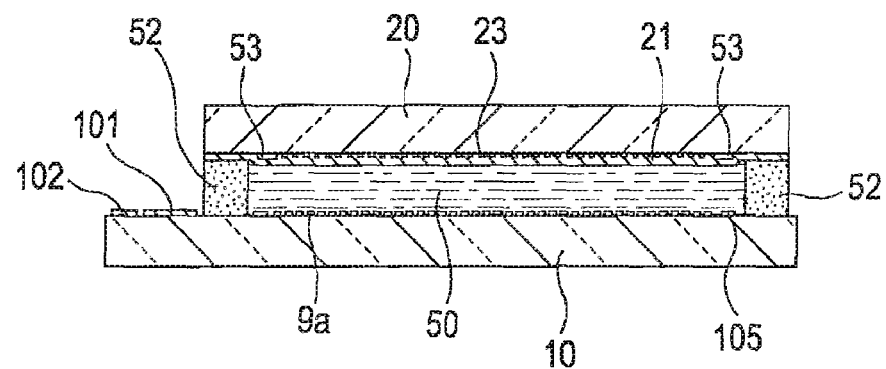
FIG. 2 is a sectional view taken along line II-II of FIG. 1.

FIG. 1 is a plan view of the liquid crystal device as viewed from the counter substrate side, showing a TFT array substrate and components formed thereon; and FIG. 2 is a sectional view taken along line II-II of FIG. 1.

Referring to FIGS. 1 and 2, the liquid crystal device of this embodiment has a TFT array substrate 10 and a counter substrate 20 opposed thereto. The TFT array substrate 10 is a transparent substrate made of quartz, glass, or silicon. The counter substrate 20 is also a transparent substrate as is the TFT array substrate 10. Between the TFT array substrate 10 and the counter substrate 20 is sealed a liquid crystal layer 50. The TFT array substrate 10 and the counter substrate 20 are bonded together, with a sealing member 52 in the sealing region around an image display region 10a having a plurality of pixels.

Referring to FIG. 1, a frame light-shielding film 53 that defines the frame of the image display region 10a underlies the counter substrate 20 in such a manner that it is disposed inside and in parallel with the sealing region in which the sealing member 52 is disposed. As an alternative, part or all of the frame light-shielding film 53 may be disposed in the TFT array substrate 10. Of the peripheral region, the region outside the sealing region having the sealing member 52 has a data-line driving circuit 101 and external-circuit connection terminals 102 along one side of the TFT array substrate 10. Scanning-line driving circuits 104 are disposed along two sides adjacent to this side in such a manner as to be covered, with the frame light-shielding film 53. To connect the two scanning-line driving circuits 104 disposed on both sides of the image display region 10a, a plurality of wires 105 is disposed along the remaining one side of the TFT array substrate 10 in such a manner as to be covered with the frame light-shielding film 53.

There are vertically conducting members 106 serving as terminals for vertically conducting the substrates at the four corners of the counter substrate 20. The TFT array substrate 10 has vertically conducting terminals opposed to the corners. Thus, the TFT array substrate 10 and the counter substrate 20 can be electrically continuous.

Referring to FIG. 2, the TFT array substrate 10 has thereon a layer structure of pixel switching TFTs, scanning lines, and data lines. The image display region 10a has pixel electrodes 9a in matrix form on the pixel switching TFTs and lines such as scanning lines and data lines. On the pixel electrodes 9a is provided an alignment film. The surface of the counter substrate 20 facing the TFT array substrate 10 underlies a light-shielding film 23. The light-shielding film 23 is made of, for example, light-shielding metal, which is patterned in lattice form or the like in the image display region 10a on the counter substrate 20. Over the light-shielding film 23 is provided a transparent counter electrode 21 made of ITO or the like is provided so as to be opposed the pixel electrodes 9a. The counter electrode 21 has thereon an alignment film. The liquid crystal layer 50 is formed of one or more kinds of nematic liquid crystal, and is oriented in a specified direction between the pair of alignment films.

The TFT array substrate 10 shown in FIGS. 1 and 2 may further has, in addition to the data-line driving circuit 101 and the scanning-line driving circuits 104, a sampling circuit which samples the image signals on the image signal lines and send them to the data lines, a precharge circuit which applies precharge signals of a predetermined voltage level to the data lines prior to the image signals, and an inspection circuit for checking the quality and defects of the electrooptic device during manufacture and shipment.

Figure 3:
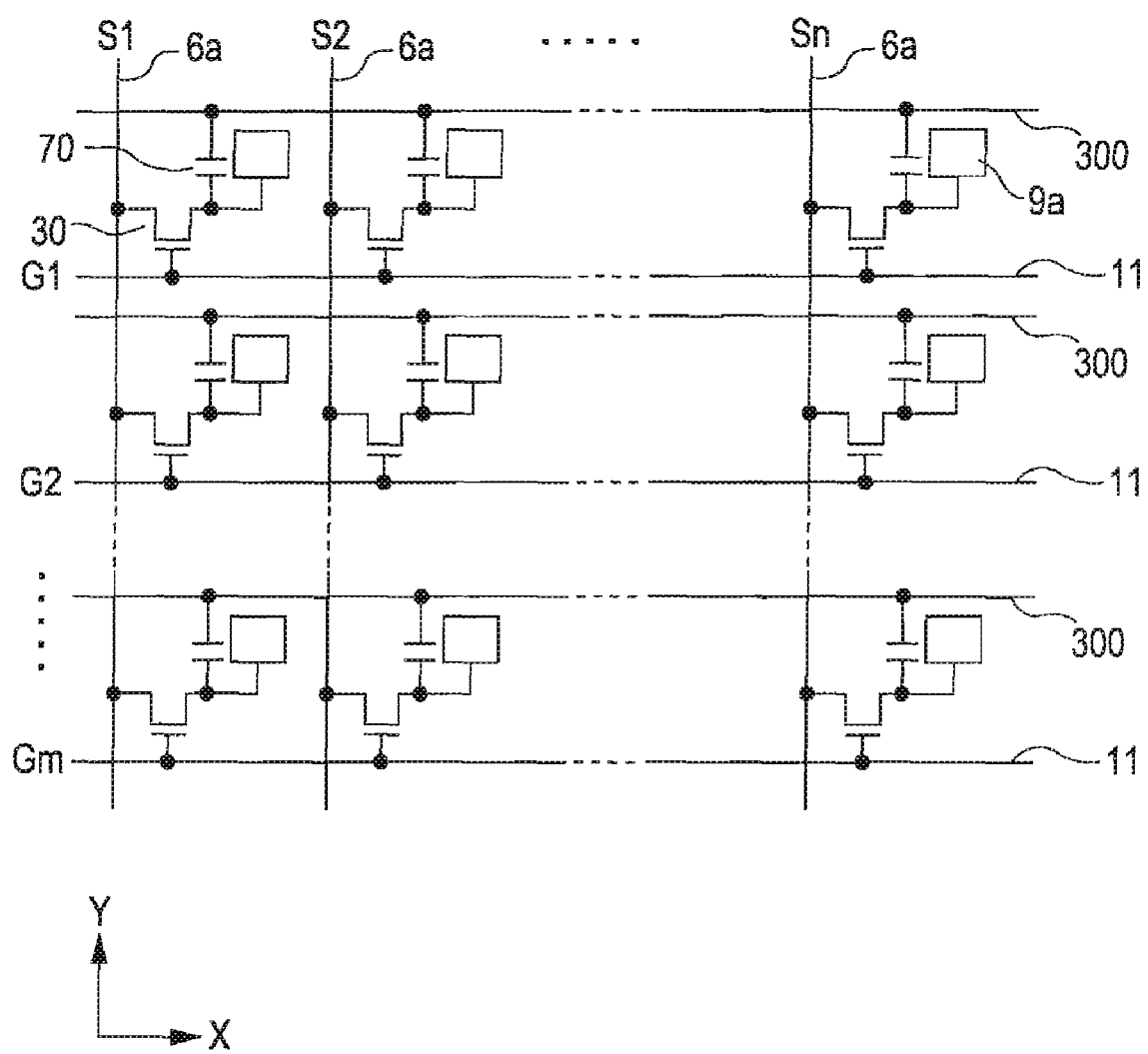
FIG. 3 is an equivalent circuit of a plurality of pixel sections of the liquid crystal device according to the first embodiment.

Referring next to FIG. 3, the electrical structure of the liquid crystal device according to this embodiment will be described.

FIG. 3 is an equivalent circuit of the elements and wires of a plurality of pixels in matrix form which constitute the image display region 10a of the liquid crystal device of the embodiment.

In FIG. 3, the matrix pixels which constitute the image display region 10a each have the pixel electrode 9a and a TFT 30, one example of "a transistor" of the invention. The TFT 30 is electrically connected to the pixel electrode 9a to control the switching of the pixel electrode 9a during the operation of the liquid crystal device. The data lines 6a to which image signals are sent are each electrically connected to the source of each TFT 30. Image signals S1 to Sn to be written to the data lines 6a may be fed in line sequence in this order or may be fed to adjacent data lines 6a in groups.

The scanning lines 11 are each electrically connected to the gate of each TFT 30. The liquid crystal device of this embodiment is configured to apply pulsed scanning signals G1 to Gm to the scanning lines 11 at a predetermined timing in that order in line sequence. The pixel electrodes 9a are each electrically connected to the drain of each TFT 30, so that the image signals S1 to Sn fed through the data lines 6a are written to the pixel electrodes 9a at a predetermined timing when the TFTs 30 which are switching elements are closed for a fixed time period. The image signals S1 to Sn of a predetermined level written to the liquid crystal of the liquid crystal layer 50 (see FIG. 2) via the pixel electrodes 9a are held for a fixed period between them and the counter electrode 21 of the counter substrate 20.

The liquid crystal of the liquid crystal layer 50 changes in the orientation or order of the molecules according to the applied voltage level to modulate light to allow gray-level display. In a normally white mode, the transmittance of incident light is decreased according to the voltage applied on a pixel basis; in a normally black mode, the transmittance of incident light is increased according to the voltage applied on a pixel basis, thus allowing the liquid crystal device to emit light with a contrast according to the image signals.

To prevent the held image signals from leaking, a storage capacitor 70 is added in parallel with the liquid crystal capacitor formed between each pixel electrode 9a and the counter electrode 21 (see FIG. 2). The storage capacitor 70 is a capacitor element serving as a hold capacitor for temporarily holding the potential of each pixel electrode 9a according to the application of image signals. One electrode of the storage capacitor 70 is electrically connected to the drain of the TFT 30 in parallel with the pixel electrode 9a, and the other electrode is electrically connected to a fixed-potential capacitor line 300 so as to provide a fixed potential. The use of the storage capacitor 70 improves the potential holding characteristic of the pixel electrode 9a, thus improving the display characteristics, for example, improving the contrast and reducing flickering. As will be discussed later, the storage capacitor 70 also functions as a built-in light-shielding film for shielding the TFT 30 from incident light.

Figure 4:
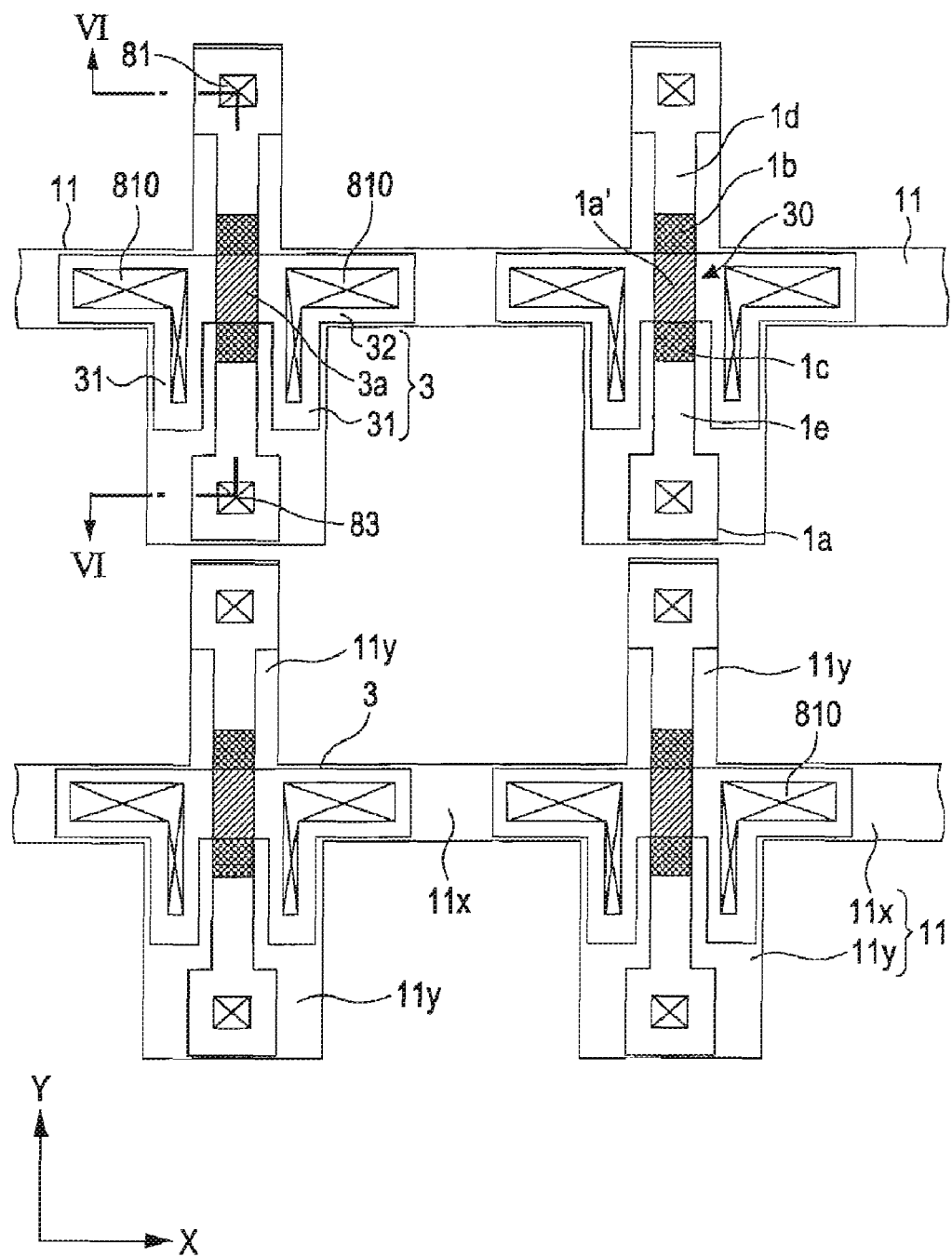
FIG. 4 is a plan view (the lower layer) of pixel sections of the liquid crystal device according to the first embodiment.
Figure 5:
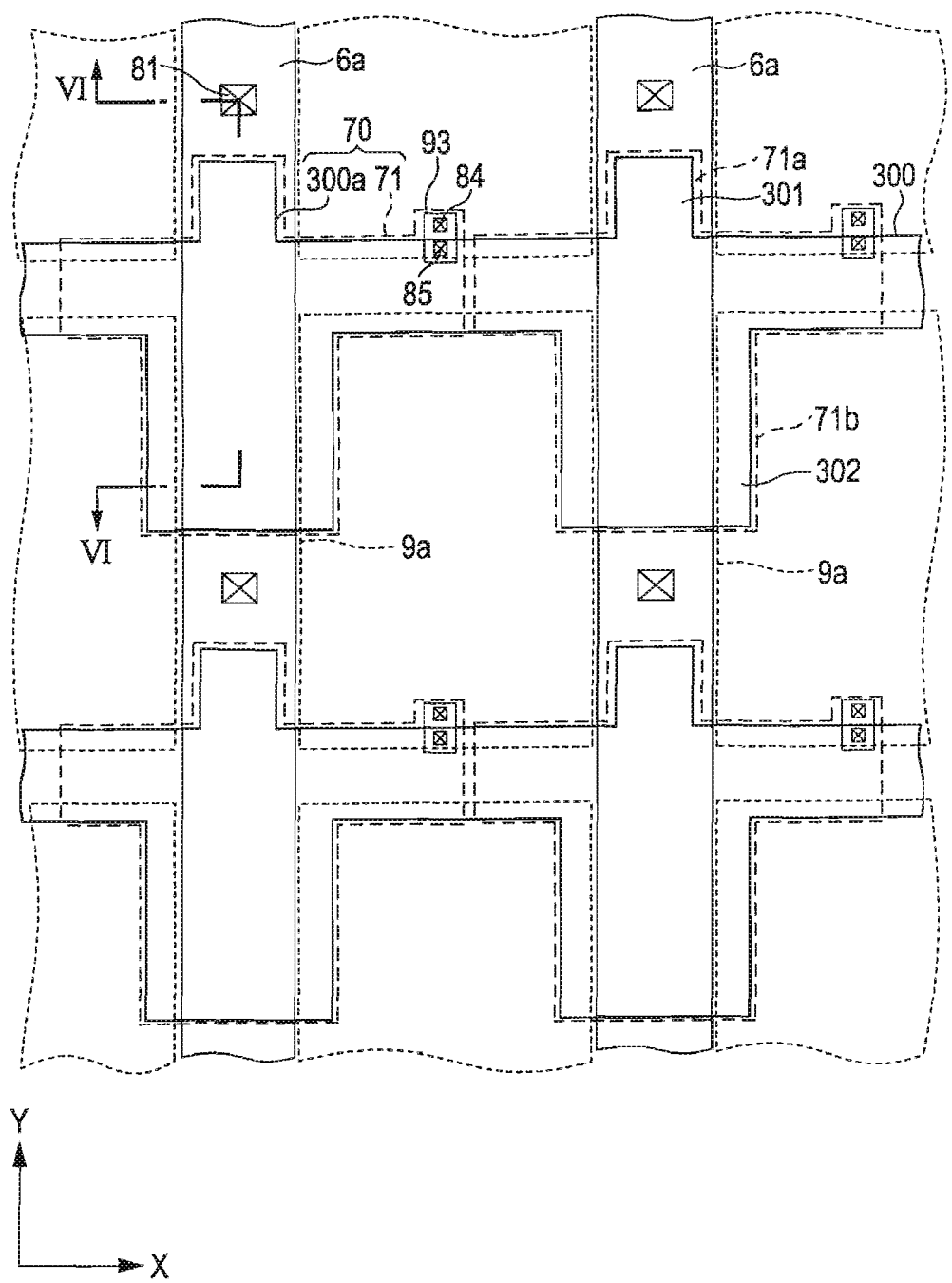
FIG. 5 is a plan view (the upper layer) of pixel sections of the liquid crystal device according to the first embodiment.
Figure 6:
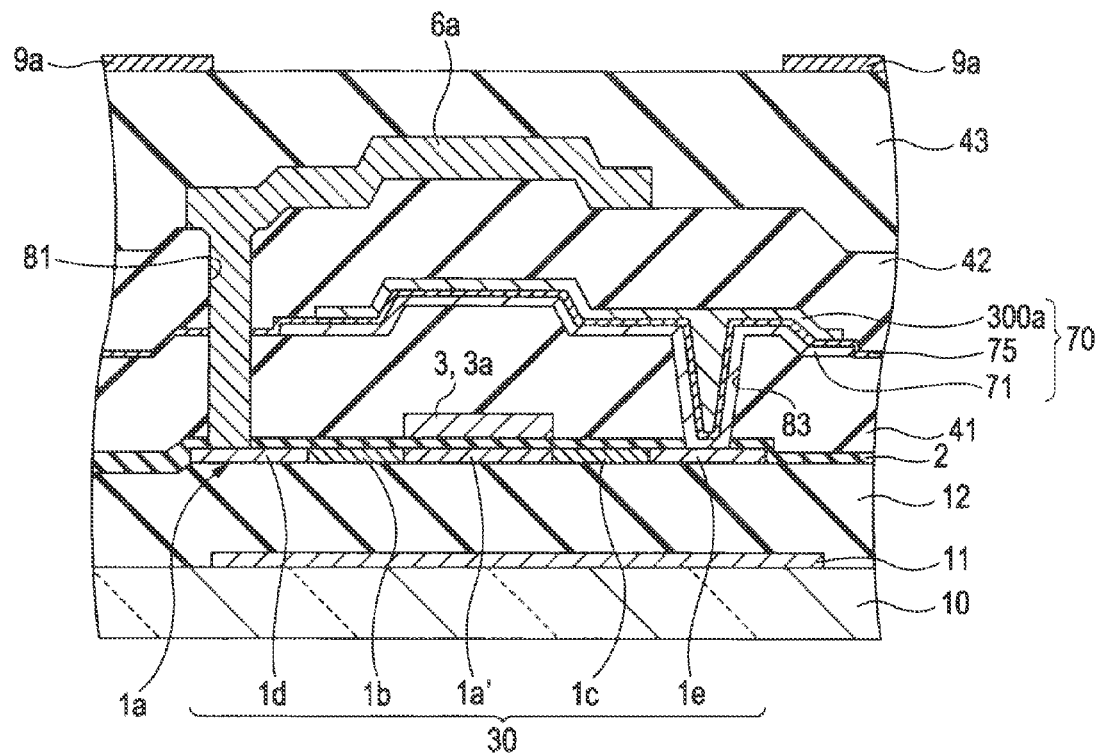
FIG. 6 is a sectional view of the layer structure of FIGS. 4 and 5, taken along line VI-VI.

Referring to FIGS. 4 to 6, the concrete structure of the pixel section for achieving the above-described operation will be described.

FIGS. 4 and 5 are plan views of adjacent pixel sections on the TFT array substrate 10 including the data lines 6a, scanning lines 11, and pixel electrodes 9a. FIGS. 4 and 5 show the lower layer (FIG. 4) and the upper layer (FIG. 5) of the layer structure, respectively, described later. FIG. 6 is a sectional view of the layer structure of FIGS. 4 and 5, taken along line VI-VI.

FIG. 6 shows the layers and components on different, scales to allow them to be easily viewed on the drawing. FIGS. 5 and 6 omit the part above the pixel electrodes 9a for the convenience of description.

Referring to FIG. 5, matrix pixel electrodes 9a are disposed on the TFT array substrate 10 (outlined by dotted lines).

As shown in FIGS. 4 and 5, the data lines 6a and the scanning lines 11 are disposed along the vertical and horizontal boundaries of the pixel electrodes 9a. That is, the scanning lines 11 extend in the X direction, and the data lines 6a extend in the Y direction in such a manner as to cross the scanning lines 11. The TFTs 30 are disposed at the intersections of the scanning lines 11 and the data lines 6a.

The scanning lines 11, the data lines 6a, the storage capacitors 70, intermediate layers 93, and the TFTs 30 are disposed in a non-open area surrounding the open area of each pixel corresponding to each pixel electrode 9a (the region of each pixel which light that is actually used for display passes through or reflected by) on the TFT array substrate 10 in plan view. That is, the scanning lines 11, the data lines 6a, the storage capacitors 70, the intermediate layers 93, and the TFTs 30 are disposed not in the open area of each pixel but in the non-open area so as not to interfere with display. The scanning lines 11, the storage capacitors 70, the data lines 6a, and the intermediate layers 93 define part of the non-open area.

As shown in FIG. 6, on the TFT array substrate 10 is provided a layer structure of the scanning lines 11, the TFTs 30, the storage capacitors 70, the data lines 6a, and the pixel electrodes 9a. The layer structure includes, from the bottom, a first layer including the scanning lines 11, a second layer including the TFTs 30 having the gate electrodes 3, a third layer including the storage capacitors 70, a fourth layer including the data lines 6a, and a fifth layer (the uppermost layer) including the pixel electrodes 9a. Between the first and second layers is provided an underlying insulating film 12; between the second and third layers is provided a first interlayer insulating film 41; between the third and fourth layers is provided a second interlayer insulating film 42; and between the fourth and fifth layers is provided a third interlayer insulating film 43, which prevent the components from short circuit. The insulating films 12, 41, 42, and 43 have a contact hole 81 for electrically connecting a data-line-side drain region 1d in the semiconductor layer 1a of the TFT 30 and the data lines 6a together. Those components will be described herein from the bottom. Of the layer structure, from the first layer to the first interlayer insulating film 41 is shown in FIG. 4 as a lower layer, and from the third to fifth layers are shown in FIG. 5 as an upper layer.

Structure of First Layer—Scanning Lines etc.—

Referring to FIG. 6, the scanning line 11 is provided as a first layer. The scanning line 11 is made of a light-shielding conductive material such as a high-melting-point metallic material such as tungsten, tantalum, or titanium nitride.

As shown in FIG. 4, the scanning lines 11 have a stripe pattern along the X direction. More specifically, the scanning lines 11 each have a main line 11x extending in the X direction and an extending portion 11y extending from the main line 11x in the Y direction. The extending portions 11y of adjacent scanning lines 11 are not connected to each other, so that the scanning lines 11 are separate from one another.

Structure of Second Layer—TFTs etc.—

Referring to FIG. 6, the TFT 30 is disposed as a second layer.

As shown in FIGS. 4 and 6, the TFT 30 includes the semiconductor layer 1a and the gate electrode 3.

The semiconductor layer 1a is made of, for example, polysilicon, and includes a channel region 1a' extending in the Y direction, a data-line-side LDD region 1b, a pixel-electrode-side LDD region 1c, a data-line-side source drain region 1d and a pixel-electrode-side source drain region 1e. Briefly, the TFT 30 has an LDD structure. The data-line-side LDD region 1b is an example of "a first junction region" of the invention. The pixel-electrode-side LDD region 1c is an example of "a second junction region" of the invention.

The data-line-side source drain region 1d and the pixel-electrode-side source drain region 1e are disposed substantially in mirror symmetry in the Y direction about the channel region 1a'. The data-line-side LDD region 1b is formed between the channel region 1a' and the data-line-side source drain region 1d. The pixel-electrode-side LDD region 1c is formed between the channel region 1a' and the pixel-electrode-side source drain region 1e. The data-line-side LDD region 1b, the pixel-electrode-side LDD region 1c, the data-line-side source drain region 1d, and the pixel-electrode-side source drain region 1e are impurity regions in which impurities are implanted to the semiconductor layer 1a by, for example, ion plantation. The data-line-side LDD region 1b and the pixel-electrode-side LDD region 1c are low-concentration impurity regions with less impurities than the data-line-side source drain region 1d and the pixel-electrode-side source drain region 1e. These impurity regions can reduce OFF-state current flowing to the source region and the drain region while the TFT 30 is off, and prevents a decrease in ON-state current flowing and an increase in OFF-leak current while the TFT 30 is on. It is preferable that the TFT 30 have an LDD structure. However, it may have an offset structure in which no impurities are implanted to the data-line-side LDD region 1b and the pixel-electrode-side LDD region 1c, or alternatively, may be of a self alignment type in which high-concentration impurities are implanted using the gate electrode 3a as the mask to form a data-line-side source drain region and a pixel-electrode-side source drain region.

The scanning line 11 and the semiconductor layer 1a are insulated from each other by the underlying insulating film 12 as an example of "a first insulating film" of the invention. The underlying insulating film 12 has the function of insulating the semiconductor layer 1a from the scanning lines 11 and the function of preventing the degradation of the characteristics of the pixel-switching TFT 30 due to the roughness of the surface of the TFT array substrate 10 after polishing and contaminants remaining after cleaning, because it is formed all over the TFT array substrate 10.

Referring to FIG. 4, the underlying insulating film 12 has contact holes 810, an example of "a contact hole" according to the invention. The structure of the contact hole 810 will be described in detail later with reference to FIGS. 7 to 9.

As shown in FIGS. 4 and 6, the gate electrode 3 is disposed above the semiconductor layer 1a, with a gate insulating film 2 therebetween. That is, the TFT 30 is a top gate type TFT. The gate electrode 3 is made of a light-shielding conductive material such as high-melting-point metal such as tungsten, tantalum, and titanium nitride. The gate electrode 3 may be formed of conductive polysilicon, for example.

As shown in FIG. 4, the gate electrode 3 has a main portion 3a overlapping the channel region 1a' of the TFT 30, an extending portion 32 extending from the main portion 3a in the X direction, and an extending portion 31 extending from the main portion 3a in the Y direction. The extending portions 31 and 32 are examples of "a gate-electrode extending portion" of the invention. The gate electrode 3 is electrically connected to the scanning line 11 via the contact hole 810 passing through the gate insulating film 2 and the underlying insulating film 12.

In this embodiment, the gate electrodes 3 of the TFTs 30 are disposed apart from one another. As an alternative, the gate electrodes 3 of the TFTs 30 corresponding to the same scanning line 11 (TFTs 30 adjacent in the X direction) may be connected together, for example. In other words, another scanning line 11 may be formed on a layer opposite to the semiconductor layer 1a including the gate electrode 3 of the TFT 30 corresponding to the same scanning line 11. In this case, the scanning lines 11 can be doubled, allowing scanning signals to be fed to the gate electrode 3 more reliably, Structure of Third Layer—Storage Capacitor etc.—

Referring to FIG. 6, the storage capacitor 70 is provided as a third layer. The storage capacitor 70 is disposed above the TFT 30, with the first interlayer insulating film 41, one example of "a second insulating film" of the invention, therebetween.

The storage capacitor 70 is formed such that a lower capacitor electrode 71 and an upper capacitor electrode 300a are opposed, with a dielectric film 75 therebetween.

As shown in FIGS. 5 and 6, the upper capacitor electrode 300a is part of a capacitor line 300. The capacitor line 300 extends from the image display region 10a having the pixel electrodes 9a to the periphery. The upper-capacitor electrode 300a is a constant-potential-side capacitor electrode which is electrically connected to a constant potential source through the capacitor line 300 so that it is maintained at a constant potential. The upper capacitor electrode 300a is formed of a non-transparent metallic film containing, for example, aluminum or silver or an alloy thereof, and functions also as an upper light-shielding film (built-in light-shielding film) for the TFT 30. The upper capacitor electrode 300a may be a metal element, an alloy, metal silicide, polysilicide, or a layer thereof containing at least one of high-welding-point metals such as titanium, chromium, tungsten, tantalum, molybdenum, and palladium.

The lower capacitor electrode 71 is a pixel-potential-side capacitor electrode which is electrically connected to the pixel-electrode-side source drain region 1e of the TFT 30 and the pixel electrode 9a. More specifically, the lower capacitor electrode 71 is electrically connected to the pixel-electrode-side source drain region 1e via a contact hole 83, and to the intermediate layer 93 in the same layer (the fourth layer) as the data line 6a via a contact hole 84 (see FIG. 5) passing through the second interlayer insulating film 42 and the dielectric film 75. The intermediate layer 93 (see FIG. 5) is electrically connected to the pixel electrode 9a via a contact hole 85 (see FIG. 5) of the third interlayer insulating film 43. That is, the lower capacitor electrode 71 relays the electrical connection between the pixel-electrode-side source drain region 1e and the pixel electrode 9a in cooperation with the intermediate layer 93. The lower capacitor electrode 71 is made of conductive polysilicon. Thus, the storage capacitor 70 has a so-called metal-insulator-semiconductor (MIS) structure. The lower capacitor electrode 71 is disposed between the upper capacitor electrode 300a serving as an upper light-shielding film and the TFT 30 so that it serves as a light absorbing layer or light shielding film, in addition to serving as the pixel-potential-side capacitor electrode.

The dielectric film 75 has a single layer structure or a multilayer structure of, for example, a silicon oxide film such as a high-temperature oxide (HTO) film or a low-temperature oxide (LTO) film or a silicon nitride film.

The lower capacitor electrode 71 may be made of a metal film as is the upper capacitor electrode 300a. That is, the storage capacitor 70 may have a metal-insulator-metal (MIM) structure, a dielectric film (insulating film), and a metal film.

As shown in FIGS. 4 and 5, in this embodiment, the storage capacitor 70 is formed so as to cover the contact hole 810. Accordingly, as will be specifically described with reference to FIGS. 7 to 9, the storage capacitor 70 has a recessed portion 70t along the surface of a recess 710 which is formed on the upper surface of the first interlayer insulating film 41 because of the contact hole 810.

Structure of Fourth Layer—Data Lines etc.—

Referring to FIG. 6, the data line 6a is formed as a fourth layer. The fourth layer further has the intermediate layer 93 (see FIG. 5) made of the same film as the data line 6a.

As shown in FIGS. 5 and 6, the data line 6a is electrically connected to the data-line-side source drain region 1d of the semiconductor layer 1a via the contact hole 81 passing through the first interlayer insulating film 41, the dielectric film 75, and the second interlayer insulating film 42. The data line 6a and the inside of the contact hole 81 are made of, for example, an aluminum containing material such as aluminum-silicon-copper or aluminum-copper, an aluminum element, or a multilayer of aluminum and titanium nitride or the like. The data line 6a further has the function of shielding the TFT 30.

Referring to FIG. 5, the intermediate layer 93 is formed in the same layer as the data line 6a on the second interlayer insulating film 42 (see FIG. 6). The data line 6a and the intermediate layer 93 are formed apart from each other in such a manner that a conductive thin film made of metal or the like is formed on the second interlayer insulating film 42 by thin film deposition, part of which is then removed by patterned. Thus, the data line 6a and the intermediate layer 93 can be formed by the same process, simplifying the process of manufacturing the device.

Structure of Fifth Layer—Pixel Electrodes etc.—

Referring to FIG. 6, the pixel electrodes 9a are disposed as a fifth layer. The pixel electrodes 9a are formed above the data line 6a, with the third interlayer insulating film 43 therebetween.

As shown in FIGS. 5 and 6, the pixel electrodes 9a are each electrically connected to the pixel-electrode-side source drain region 1e of the semiconductor layer 1a through the lower capacitor electrode 71, the contact holes 83, 84, and 85, and the intermediate layer 93. On the surface of the pixel electrode 9a is provided an alignment film subjected to predetermined alignment such as rubbing.

The structure of the pixel section described above is common to all the pixel sections, as shown in FIGS. 4 and 5. The image display region 10a (see FIG. 1) has these pixel sections at regular intervals.

Figure 7:
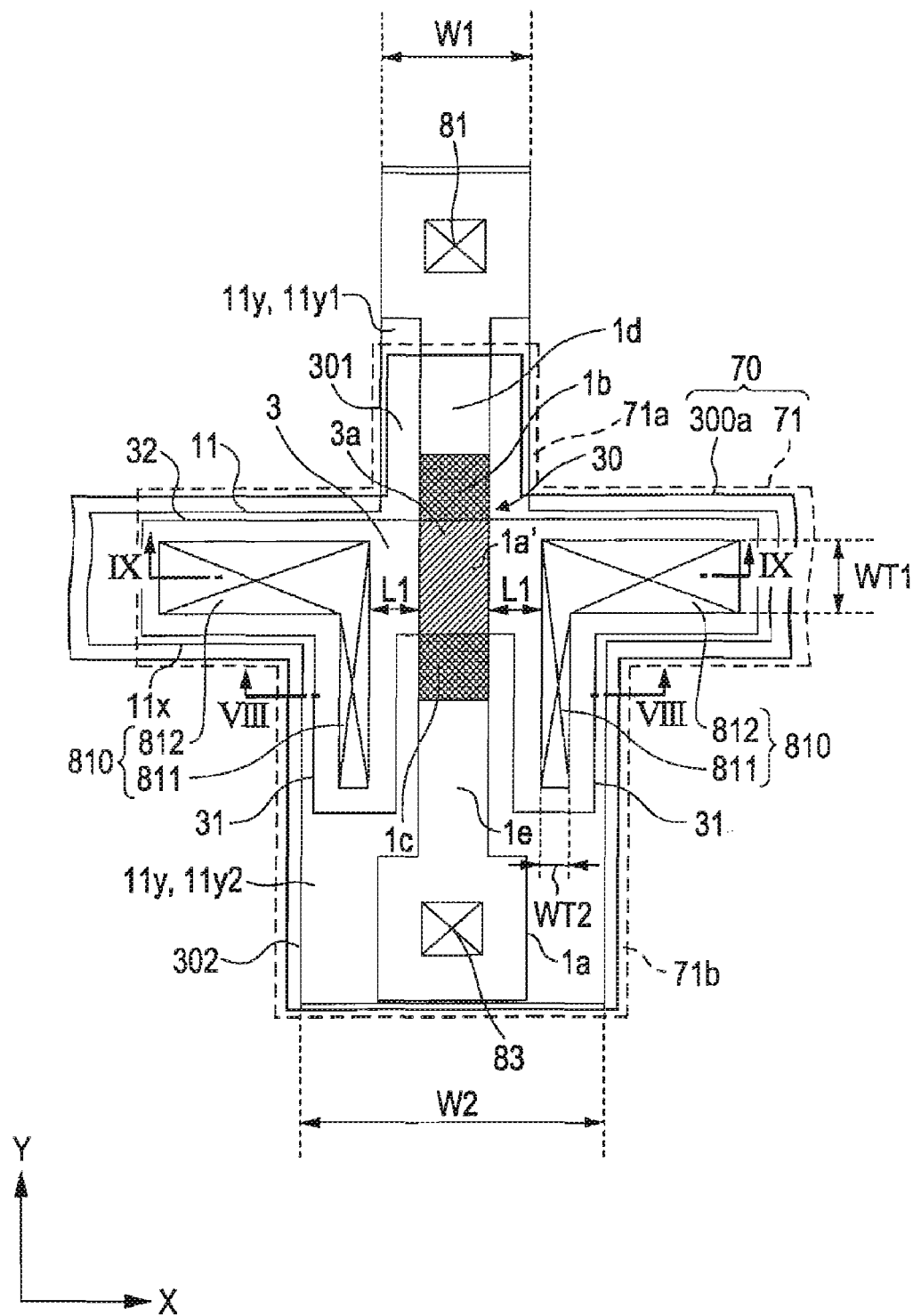
FIG. 7 is a plan view of the contact hole between the scanning line and the gate electrode and a storage capacitor.
Figure 8:
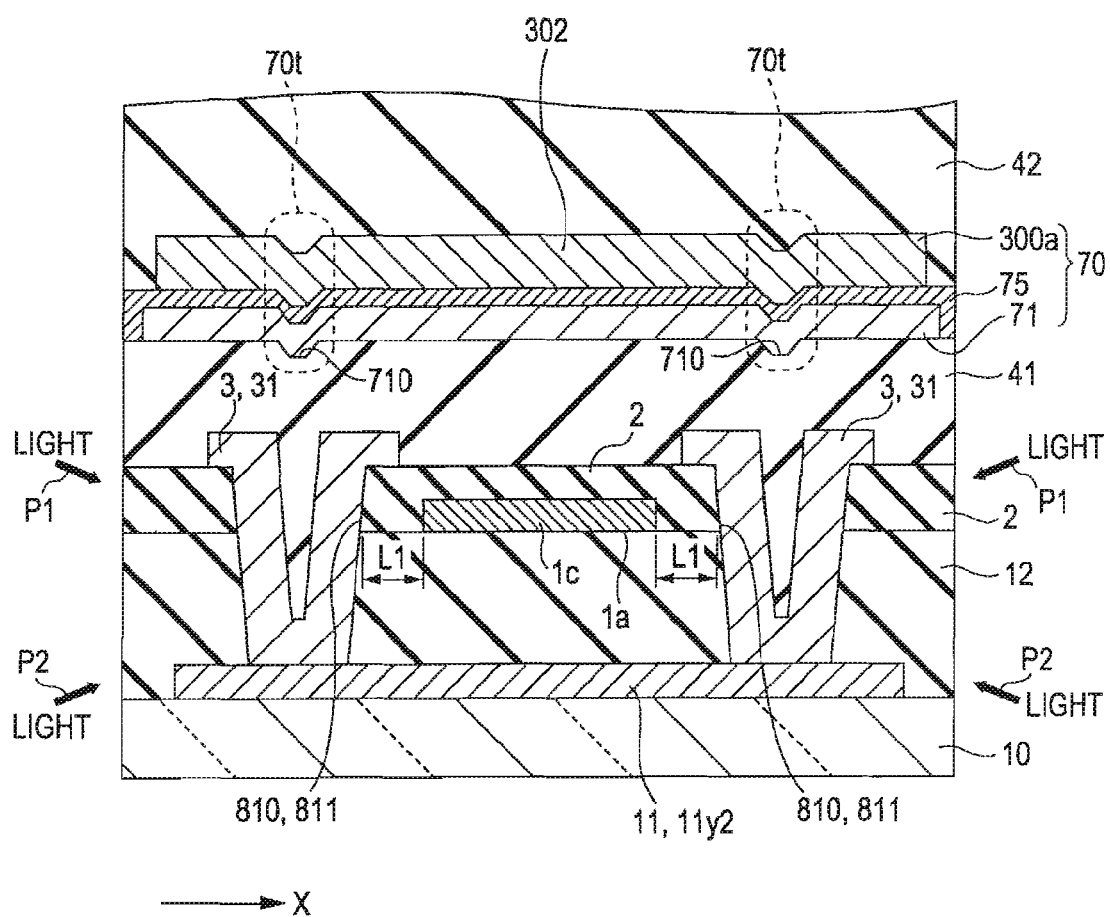
FIG. 8 is a sectional view taken along line VIII-VIII of FIG. 7.
Figure 9:
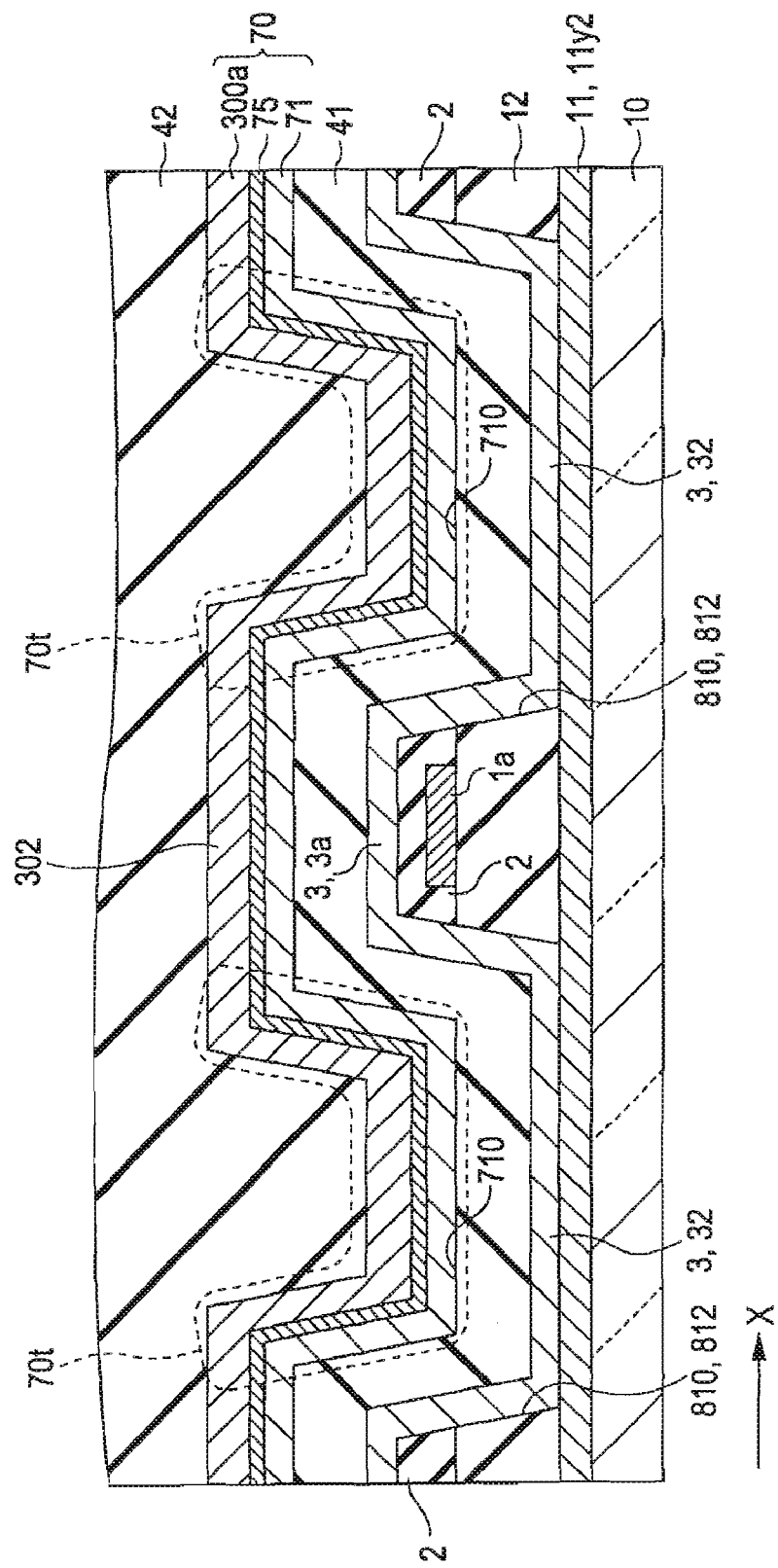
FIG. 9 is a sectional view taken along line IX-IX of FIG. 7.

Referring to FIGS. 7 to 9, the plan view of the scanning line 11, the gate electrode 3, and the contact hole 810 that electrically connects the scanning line 11 and the gate electrode 3, together with the shape of the storage capacitor 70, will be described.

FIG. 7 is a plan view of the scanning lines 11, the gate electrodes, the contact hole 810 that electrically connects the scanning line 11 and the gate electrode 3, and the storage capacitor 70 according to this embodiment. FIG. 8 is a sectional view taken along line VIII-VIII of FIG. 7. FIG. 9 is a sectional view taken along line IX-TX of FIG. 7.

FIG. 7 shows the scanning line 11, the TFT 30, and the storage capacitor 70 of the components of the pixel sections shown in FIG. 4 on an enlarged scale, and omits the other components. FIGS. 8 and 9 omit the components above the second interlayer insulating film 42.

Referring to FIG. 7, the scanning line 11 has the main line 11x extending in the X direction and an extending portion 11y extending from the main line 11x in the Y direction, as described above with reference to FIG. 4. The extending portion 11y has a first extending portion 11y1 including a region opposed to the data-line-side LDD region 1b and a second extending portion 11y2 including a region opposed to the pixel-electrode-side LDD region 1c. Thus, the light which comes from the lower layer in the data-line-side LDD region 1b and the pixel-electrode-side LDD region 1c can be blocked off by the first extending portion 11y1 and the second extending portion 11y2, respectively. Thus, the occurrence of light leakage current in the data-line-side LDD region 1b and the pixel-electrode-side LDD region 1c can be reduced.

In this embodiment, the second extending portion 11y2 of the scanning line 11 is wider in the X direction than the first extending portion 11y1. That is, the width W2 of the second extending portion 11y2 in the X direction is larger than the width W1 of the first extending portion 11y1 in the X direction. This allows the light that comes from the lower layer in the pixel-electrode-side LDD region 1c to be blocked off more than the light that comes from the lower layer in the data-line-side LDD region 1b. This increases the light shielding effect on the pixel-electrode-side LDD region 1c in which light leakage current is relatively prone to occur, thereby effectively reducing light leakage current flowing to the TFT 30.

As shown in FIGS. 7 to 9, the gate electrode 3 and the scanning line 11 are electrically connected via the contact hole 810 passing through the gate insulating film 2 and the underlying insulating film 12.

As shown in FIG. 7, particularly in this embodiment, the contact hole 810 has a first portion 811 extending beside the semiconductor layer 1a in the Y direction and a second portion 812 overlapping with part of the main line 11x of the scanning line 11 and extending in the X direction. That is, the contact hole 810 has an L shape in plan view, in which the first portion 811 and the second portion 812 are connected. As described with reference to FIG. 4, the gate electrode 3 has the main portion 3a overlapping with the channel region 1a' of the TFT 30 and the extending portions 31 and 32 extending from the main portion 3a in such a manner as to overlap with the contact hole 810. The extending portion 31 extends in the Y direction so as to cover the first portion 811 of the contact hole 810. The extending portion 32 extends in the X direction so as to cover the second portion 812 of the contact hole 810. Thus, as shown in FIG. 8, part of the extending portion 31 is formed in the first portion 811 of the contact hole 810, and is in contact with the scanning line 11 (more specifically, part of the second extending portion 11y2). Likewise, as shown in FIG. 9, part of the extending portion 32 is formed in the second portion 812 of the contact hole 810, and is in contact with the scanning line 11 (more specifically, part of the main line 11x).

This structure can reduce the contact resistance between the gate electrode 3 and the scanning line 11 while maintaining a high open area ratio.

That, is, particularly in this embodiment, the contact hole 810 has the first portion 811 and the second portion 812, as described above. Therefore, the area of the contact hole 810 in the limited non-open area can be larger than the case in which the contact hole 810 has a typical shape in plan view as a general contact hole, such as a circle or a square, or the case in which the contact hole 810 has only one of the first portion 811 and the second portion 812. Thus, the open area ratio can be increased while reducing the electrical resistance between the gate electrode 3 and the scanning line 11.

Since the contact hole 810 has an L shape in plan view in which the first portion 811 and the second portion 812 are connected, as in this embodiment, electrical disconnection between the gate electrode 3 and the scanning line 11 can be prevented. That is, in the case where the contact hole 810 has a rectangular or long shape as in the case where the contact, hole 810 has a rectangular or long shape, for example, having only one of the first portion 811 and the second portion 812, it may be difficult to provide a contact hole that reaches the scanning line 11 when a long contact hole is required as the open area ratio increases and the device is reduced in size. However, our experience shows that this contact hole 810 with L-shape plan view, as in this embodiment, can easily be opened at least at the bent portion (in other words, at the connection or intersection of the first portion 811 and the second portion 812) so as to reach the scanning line 11. Thus, the gate electrode 3 and the scanning line 11 can be electrically connected reliably.

Furthermore, particularly in this embodiment, the first portion 811 of the contact hole 810 extends beside the semiconductor layer 1a in the Y direction. More specifically, the first portion 811 extends longitudinally in the Y direction along the side of the semiconductor layer 1a extending in the Y direction, with a distance L1 apart therefrom.

Thus, as shown in FIG. 8, part of the gate electrode 3 (more accurately, the extending portion 31) formed in the first portion 811 is formed as a wall-like light shield extending along the semiconductor layer 1a, as viewed in three dimensions. Thus, the light incident at an angle on the semiconductor layer 1a (that is, for example, the light which comes in the direction indicated by the arrow P1 in FIG. 8, that is, incident light having an X or Y component, or the light which comes in the direction indicated by the arrow P2, that is, the return light having an X or Y component) can be blocked off by the first portion 811 (more accurately, part of the gate electrode 3 formed in the first portion 811). That is, the effect of blocking off the light that comes at an angle in the semiconductor layer 1a can be increased by the first portion 811 formed as a wall-like light shield disposed near the semiconductor layer 1a. Thus, the flickering and pixel-to-pixel variations in image display can be reduced.

In addition, as shown in FIGS. 7 and 8, particularly in this embodiment, the contact hole 810 is provided on both sides of the semiconductor layer 1a, so that the first portion 811 of each contact hole 810 is formed as wall-like light shield on both sides of the semiconductor layer 1a. Thus, the light that comes from both sides at an angle from in the semiconductor layer 1a can be blocked off. Thus, the light leakage current in the TFT 30 can be reduced more reliably.

As an alternative, the contact hole 810 may be provided only to one side of the semiconductor layer 1a (to the left or right in FIG. 7), so that the first portion 811 may be formed only to one side of the semiconductor layer 1a. This structure can also increase the effect of blocking off the light which comes at an angle in the semiconductor layer 1a correspondingly. However, in view of increasing the light shielding effect and reducing the contact resistance, it is preferable to provide the contact hole 810 to both sides of the semiconductor layer 1a to form the first portion 811 on both sides of the semiconductor layer 1a, as in this embodiment.

As shown in FIG. 7, particularly in this embodiment, the first portion 811 of the contact hole 810 is provided to both sides of the pixel-electrode-side LDD region 1c not to both sides of the data-line-side LDD region 1b. This increases the effect of blocking off the light to the pixel-electrode-side LDD region 1c than that to the data-line-side LDD region 1b. The inventor has concluded that light leakage current occurs more in the pixel-electrode-side LDD region 1c than in the data-line-side LDD region 1b while the TFT 30 is on. That is, the inventor has concluded that when light is applied to the pixel-electrode-side LDD region 1c when the TFT 30 is on, it is more prone to light leakage current than the data-line-side LDD region 1b. Thus, the structure in which the first portion 811 is provided to both sides of the pixel-electrode-side LDD region 1c and not to both sides of the data-line-side LDD region 1b can increase the light shielding effect on the light-leakage-prone pixel-electrode-side LDD region c, thereby effectively decreasing the light leakage current flowing in the TFT 30. In other words, the structure in which the contact hole 810 is not provided to both sides of the data-line-side LDD region 1b which is less prone to light leakage current than the pixel-electrode-side LDD region 1c can prevent a useless decrease in open area ratio.

In addition, as shown in FIG. 7, particularly in this embodiment, the width W1 of the first portion 811 of the contact hole 810 is smaller than the width W2 of the second portion 812. This prevents an increase in non-open area ratio, that is, a decrease in open area ratio because of the presence of the first portion 811. Furthermore, since the width WT2 of the second portion 812 is larger than the width WT1 of the first portion 811, the contact resistance between the gate electrode 3 and the scanning line 11 can be surely reduced by the second portion 812. That is, the light shielding effect on the TFT 30 can be increased mainly by the first portion 811 while maintaining the high open area ratio, and the contact resistance between the gate electrode 3 and the scanning line 11 can be reduced mainly by the second portion 812.

As shown in FIGS. 7 to 9, the upper capacitor electrode 300a of the storage capacitor 70 includes a first electrode portion 301 which covers the data-line-side LDD region 1b and a second electrode portion 302 which covers the pixel-electrode-side LDD region 1c. The lower capacitor electrode 71 of the storage capacitor 70 includes a first electrode portion 71a which covers the data-line-side LDD region 1b and a second electrode portion 71b which covers the pixel-electrode-side LDD region 1c. Of the first electrode portions 301 and 71a and the dielectric film 75, the part between the first electrode portions 301 and 71a is an example of "a first capacitor portion" of the invention, and of the second electrode portions 302 and 71b and the dielectric film 75, the part between the second electrode portions 302 and 71b is an example of "a second capacitor portion" of the invention.

Thus, the light that enters the data-line-side LDD region 1b from above can be blocked off by the first electrode portions 301 and 71a. The light that enters the pixel-electrode-side LDD region 1c from above can be blocked off by the second electrode portions 302 and 71b. Thus, the generation of light leakage current in the data-line-side LDD region 1b and the pixel-electrode-side LDD region 1c can be reduced.

Particularly in this embodiment, the storage capacitor 70 has the recessed portion 70t which is formed so as to cover the recess 710 formed on the surface of the first interlayer insulating film 41 because of the contact hole 810 and having a recessed cross section along the surface of the recess 710.

That is, as shown in FIGS. 8 and 9, since the underlying insulating film 12 and the gate insulating film 2 disposed lower than the first interlayer insulating film 41 have the contact hole 810, this causes the upper surface of the first interlayer insulating film 41 to have the recess 710 because of the contact hole 810, the recess 710 being substantially along the inner wall of the contact hole 810. The storage capacitor 70 is formed so as to cover the recess 710, so that part thereof is recessed in the recess 710 to form a recessed portion 70t having a recessed cross section along the surface of the recess 710. The recessed portion 70t has the portion of the upper capacitor electrode 300a overlapping with the recess 710, the portion of the dielectric film 75 overlapping with the recess 710, and the portion of the lower capacitor electrode 71 overlapping with the recess 710.

This increases the capacitance of the storage capacitor 70 by the amount corresponding to the recessed portion 70t, thereby increasing the potential holding characteristic of the pixel electrode 9a. In other words, the storage capacitor 70 having a capacitance to achieve display performance required for the product can be formed in an narrow area on the TFT array substrate 10, as compared with a case in which the storage capacitor 70 has not the recessed portion 70t (that is, the storage capacitor 70 has only a flat portion). This can reduce flickering and pixel-to-pixel variations in displaying images, and decrease device size.

Furthermore, since the recess 710 is formed because of the contact hole 810, the recess 710 (and the recessed portion 70t) has substantially the same shape in plan view as the contact hole 810 (not shown). In other words, the recessed portion 70t has, on the TFT array substrate 10 in plan view, a portion extending in the Y direction beside the semiconductor layer 1a and a portion overlapping with part of the main line 11x of the scanning line 11 and extending in the X direction. This facilitates forming the recessed portion 70t in the non-open area, thus increase the capacitance of the storage capacitor 70 almost without a decrease in open area ratio.

It is preferable that the first portion 811 and the second portion 812 of the contact hole 810 be larger in width than twice the thickness of the gate electrode 3. This structure can reduce or prevent the complete blocking of the contact hole 810 by part of the gate electrode 3 to hinder the formation of the recess 710 on the upper surface of the first interlayer insulating film 41 because of the contact hole 810. That is, this ensures that the recess 710 caused by the contact hole 810 is formed on the upper surface of the first interlayer insulating film 41. This ensures that the storage capacitor 70 has the recessed portion 70t so that the capacitance of the storage capacitor 70 is increased. Even if the widths of the first portion 811 and the second portion 812 of the contact hole 810 are less than twice the thickness of the gate electrode 3, the recess 710 can be formed by controlling the coverage ratio of the inner side wall of the contact hole 810 (that is, the ratio of the thickness of the portion of the gate electrode 3 formed on the inner side wall of the contact hole 810 (the thickness from the side wall) to the thickness of the portion of the gate electrode 3 along the surface of the TFT array substrate 10) to less than 100%.

In addition, since the recess 710 is caused by the contact hole 810, complication or increase of the manufacturing process can be substantially prevented.

As described above, in the liquid crystal device according to this embodiment, the contact hole 810 for electrically connecting the scanning line 11 and the gate electrode 3 has the first portion 811 and the second portion 812. This is suitable for increasing the open area ratio, reduces the generation of light leakage current in the pixel switching TFT 30, and achieves a good electrical connection between the gate electrode 3 of the TFT 30 and the scanning line 11. Furthermore, this structure can increase the capacitance of the storage capacitor 70 while maintaining a high open area ratio. This allows high-quality image display with little flickering and pixel-to-pixel variations.

Second Embodiment

A second embodiment will be described with reference to FIG. 10.

Figure 10:
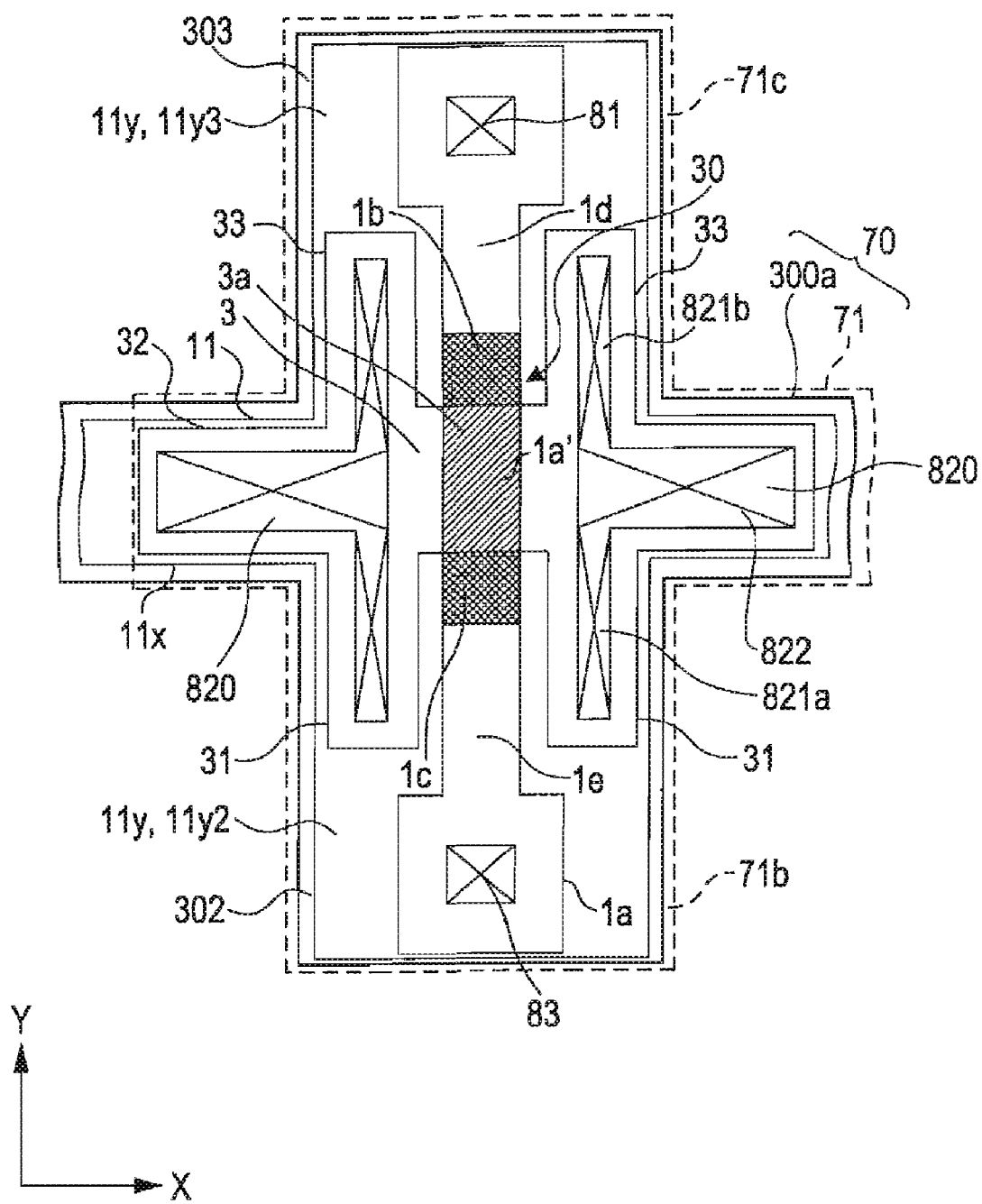
FIG. 10 is a plan view of a second embodiment, similar to FIG. 7.

FIG. 10 is a plan view of the second embodiment, similar to FIG. 7. Referring to FIG. 10, the same components as those of the first embodiment shown in FIGS. 1 to 9 are given the same reference numerals and their descriptions will be omitted as appropriate.

In FIG. 10, the liquid crystal device according to the second embodiment is different from the first embodiment in that it has a contact hole 820 in place of the contact hole 810, the gate electrode 3 has an extending portion 33 in addition to the extending portions 31 and 32, the scanning line 11 has a first extending portion 11y3 in place of the first extending portion 11y1, the lower capacitor electrode 71 has a first electrode portion 71c in place of the first electrode portion 71a, and the upper capacitor electrode 300a has a first electrode portion 303 in place of the first electrode portion 301, and is substantially the same in other components as the liquid crystal device according to the first embodiment.

Particularly in this embodiment, the contact hole 820 has, on the TFT array substrate 10 in plan view, a first portion 821a extending along the pixel-electrode-side LDD region 1c, a first portion 821b extending along the data-line-side LDD region 1b, and a second portion 822 overlapping with part of the main line 11x of the scanning line 11 and extending in the X direction. In other words, the contact hole 820 has a T shape, in plan view, composed of the first portions 821a and 821b and the second portion 822. The gate electrode 3 has a main portion 3a overlapping with the channel region 1a' of the TFT 30 and extending portions 31, 32, and 33 extending from the main portion 3a so as to overlap with the contact hole 820. The extending portion extends in the Y direction so as to cover the first portion 821a of the contact hole 820. The extending portion 32 extends in the X direction so as to cover the second portion 822 of the contact hole 820. The extending portion 33 extends in the Y direction so as to cover the first portion 821b of the contact hole 820. Thus, part of the extending portion 31 is formed in the first portion 821a of the contact hole 820 and in contact with the scanning line 11 (more specifically, part of the second extending portion 11y2). Part of the extending portion 32 is formed in the second portion 822 of the contact hole 820 and in contact with the scanning line 11 (more specifically, part of the main line 11x). Part of the extending portion 33 is formed in the first portion 821b of the contact hole 820 and in contact with the scanning line 11 (more specifically, part of the first extending portion 11y3).

This structure allows the light that enters the semiconductor layer 1a to be shielded using the first portion 821b in addition to the first portion 821a, ensuring that the generation of light leakage current in the TFT 30 is reduced.

Furthermore, since the contact hole 820 has the first portion 821b in addition to the first portion 821a, the contact resistance can be reduced more reliably to allow a better electrical connection between the gate electrode 3 and the scanning line 11.

In addition, particularly in this embodiment, the storage capacitor 70 has a recessed portion which is formed so as to cover a recess formed on the surface of the first interlayer insulating film 41 because of the contact hole 820 (that is, the first electrode portions 303 and 71c are formed so as to cover a recess formed because of the first portion 821b of the contact hole 820, and the second electrode portions 302 and 71b are formed so as to cover a recess formed because of the first portion 821a of the contact hole 820) and so has a recessed cross section along the surface of the recess. This increases the capacitance of the storage capacitor 70 by an amount corresponding to the recessed portion, thus increasing the potential holding characteristic of the pixel electrodes 9a. Furthermore, the recess (and the recessed portion) have substantially the same shape in plan view (not shown) as the contact hole 820 because they are formed because of the contact hole 820. In other words, the recessed portion has, on the TFT array substrate 10 in plan view, a portion extending in the Y direction beside the data-line-side LDD region 1b and the pixel-electrode-side LDD region 1c and a portion overlapping with part of the main line 11x of the scanning line 11 and extending in the X direction. This facilitates forming the recessed portion in the non-open area, thus increasing the capacitance of the storage capacitor 70 with little decrease in open area ratio.

While the contact hole 820 of this embodiment has a T shape in plan view, the second portion 822 may extend to the semiconductor layer 1a. This structure can increase the area of the contact hole 820, further reducing the contact resistance. This structure can further increase the size of the recess caused by the contact hole 820, thus increasing the size of the recessed portion. Thus, the capacitance of the storage capacitor 70 can be increased more.

Third Embodiment

A third embodiment will be described with reference to FIGS. 11 to 14.

Figure 11:
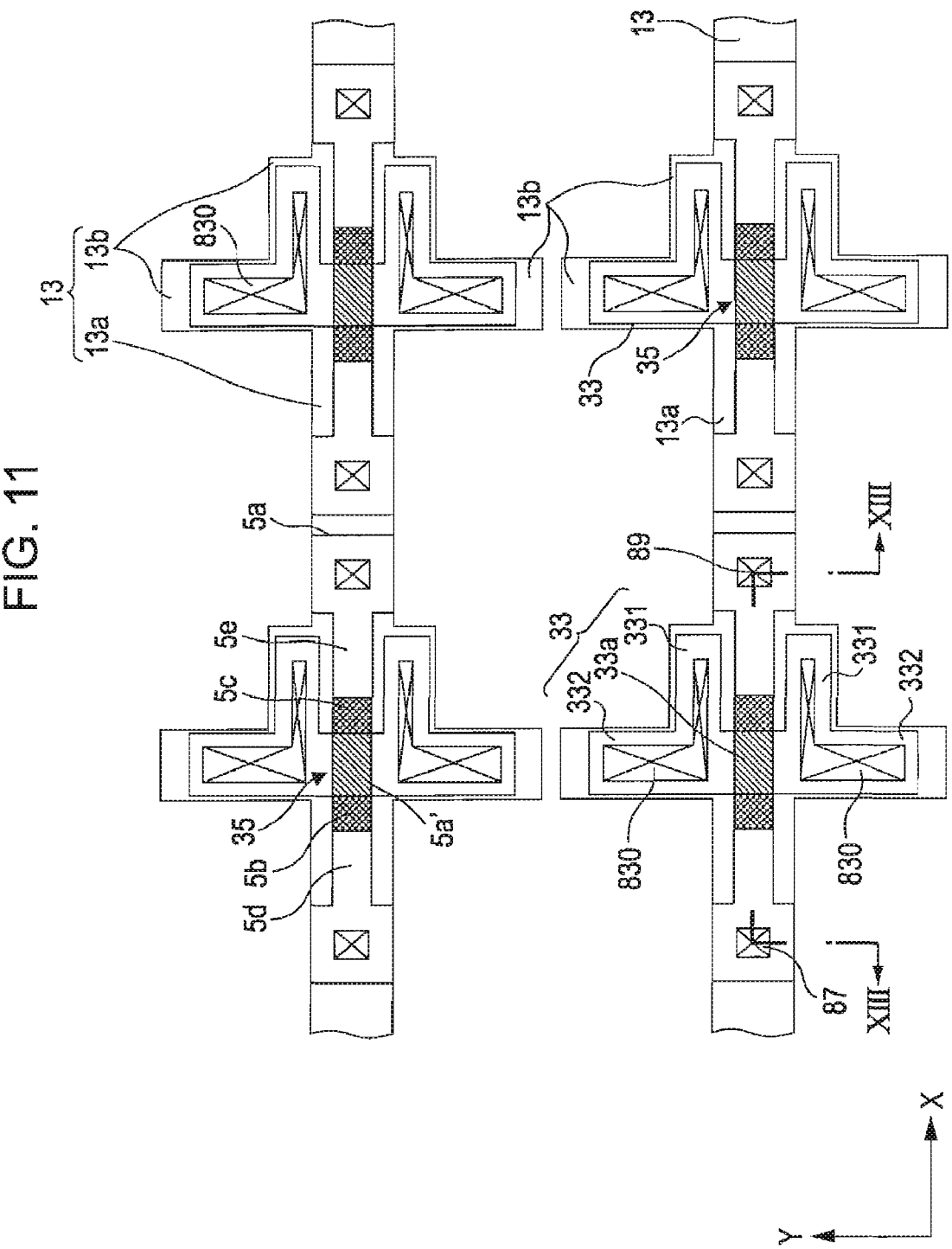
FIG. 11 is a plan view of a third embodiment, similar to FIG. 4.
Figure 12:
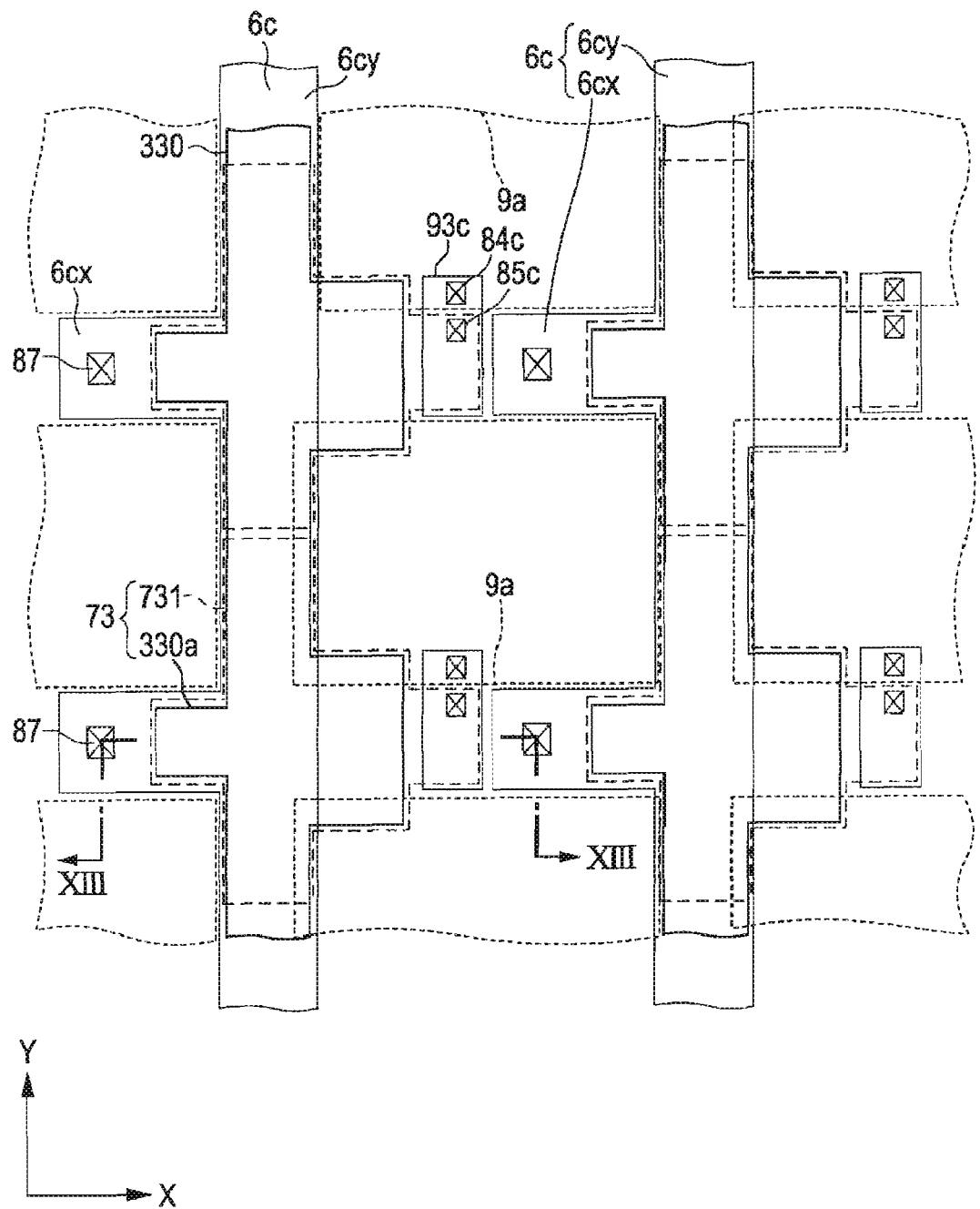
FIG. 12, is a plan view of the third embodiment, similar to FIG. 5.
Figure 13:
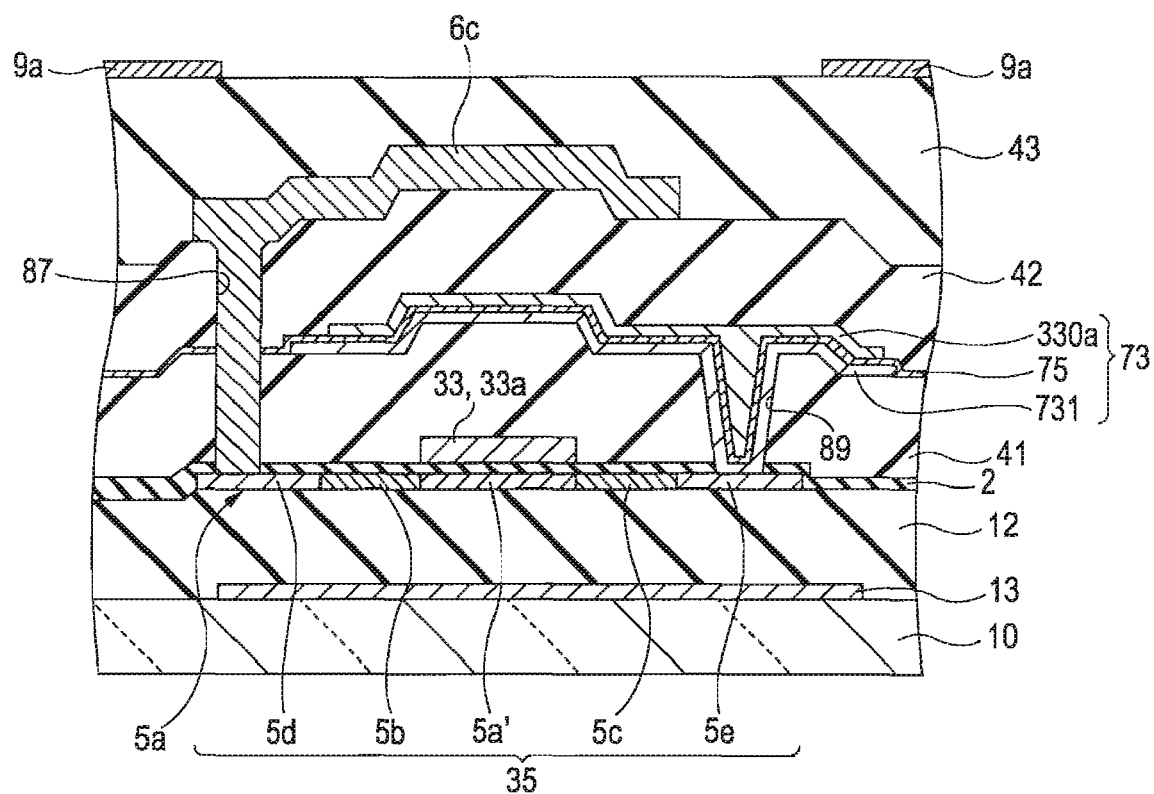
FIG. 13 is a sectional view of the layer structure of FIGS. 11 and 12, taken along line XIII-XIII.

Referring first to FIGS. 11 to 13, the structure of the pixel section of the liquid crystal device according to this embodiment will be described.

FIG. 11 is a plan view of the third embodiment, similar to FIG. 4. FIG. 12 is a plan view of the third embodiment, similar to FIG. 5. FIG. 13 is a sectional view of the layer structure of FIGS. 11 and 12, taken along line XIII-XIII. In FIGS. 11 to 13, the same components as those of the first embodiment shown in FIGS. 1 to 9 are given the same reference numerals and their descriptions will be omitted as appropriate. FIG. 13 shows the layers and components on different scales to allow them to be viewed easily on the drawing.

In FIGS. 11 to 13, the liquid crystal device according to the third embodiment is different from the liquid crystal device according to the first embodiment in that it has scanning lines 13, TFTs 35, storage capacitors 73, and data lines 6c in place of the scanning lines 11, the TFTs 30, the storage capacitors 70, and the data lines 6a, and has contact holes 830 in place of the contact holes 810 of the first embodiment, and is substantially the same in other components as the liquid crystal device according to the first embodiment.

As will be described later with reference to FIG. 11, in the case of the liquid crystal device according to the third embodiment, the semiconductor layer 5a of the TFT 35 is formed in the direction of the scanning line 13 (in the X direction), different from the first embodiment in which the semiconductor layer 1a of the TFT 30 is formed in the direction of the data line 6a (in the Y direction).

As shown in FIGS. 11 and 12, the data lines 6c and the scanning lines 13 are provided along the vertical and horizontal boundaries of the pixel electrodes 9a. That is, the scanning lines 13 extend in the X direction, and the data lines 6c extend in the Y direction so as to cross the scanning lines 13. The TFTs 35 are disposed at the intersections of the scanning lines 13 and the data lines 6c.

The scanning lines 13, the data lines 6c, the storage capacitors 73, intermediate layers 93c, and the TFTs 35 are disposed, on the TFT array substrate 10 in plan view, in the non-open area surrounding the open area of each pixel corresponding to each pixel electrode 9a.

Structure of First Layer—Scanning Lines etc.—

Referring to FIG. 13, the scanning line 13 is provided as a first layer. The scanning line 13 is made of a light-shielding conductive material such as a high-melting-point metallic material including tungsten, tantalum, and titanium nitride.

As shown in FIG. 11, the scanning lines 13 have a stripe pattern along the X direction. More specifically, the scanning lines 13 each have a main line 13a extending in the X direction and an extending portion 13b extending from the main line 13a in the Y direction. The extending portion 13b is formed so as to overlap with at least the contact hole 830, discussed later, on the TFT array substrate 10 in plan view. The extending portions 13b of adjacent scanning lines 13 are not connected to each other, so that the scanning lines 13 are separate from one another.

Structure of Second Layer—TFTs etc.—

Referring to FIG. 13, the TFT 35 is disposed as a second layer.

As shown in FIGS. 11 and 13, the TFT 35 includes the semiconductor layer 5a and a gate electrode 33.

The semiconductor layer 5a is made of, for example, polysilicon, and includes a channel region 5a1 extending in the X direction, a data-line-side LDD region 5b, a pixel-electrode-side LDD region 5c, a data-line-side source drain region 5d, and a pixel-electrode-side source drain region 5e. Briefly, the TFT 35 has an LDD structure.

The data-line-side source drain region 5a and the pixel-electrode-side source drain region 5e are disposed substantially in mirror symmetry in the X direction about the channel region 5a1. The data-line-side LDD region 5b is formed between the channel region 5a' and the data-line-side source drain region 5d. The pixel-electrode-side LDD region 5c is formed between the channel region 5a' and the pixel-electrode-side source drain region 5e.

The scanning line 13 and the semiconductor layer 5a are insulated from each other by the underlying insulating film 12. The underlying insulating film 12 has contact holes 830. The structure of the contact hole 830 will be described in detail later with reference to FIG. 14.

As shown in FIGS. 11 and 13, the gate electrode 33 is disposed above the semiconductor layer 5a, with the gate insulating film 2 therebetween. The gate electrode 33 is made of a light-shielding conductive material, such as a high-melting-point metallic material, such as tungsten, tantalum, and titanium nitride. The gate electrode 33 may be formed of conducting polysilicon, for example.

As shown in FIG. 11, the gate electrode 33 has a main portion 33a overlapping with the channel region 5a' of the TFT 35, an extending portion 331 extending from the main portion 33a in the X direction, and an extending portion 332 extending from the main portion 33a in the Y direction. The gate electrode 33 is electrically connected to the scanning line 13 via the contact hole 830 passing through the gate insulating film 2 and the underlying insulating film 12.

Structure of Third Layer—Storage Capacitor etc.—

Referring to FIG. 13, the storage capacitor 73 is provided as a third layer. The storage capacitor 73 is disposed above the TFT 35 with the first interlayer insulating film 41 therebetween.

The storage capacitor 73 is formed such that a lower capacitor electrode 371 and an upper capacitor electrode 330a are opposed with a dielectric film 75 therebetween.

As shown in FIGS. 12 and 13, the upper capacitor electrode 300a is part of a capacitor line 330. The capacitor line 330 is disposed in the Y direction, different from the capacitor line 300 of the first embodiment, which is disposed in the X direction. The capacitor line 330 extends from the image display region 10a having the pixel electrodes 9a to the periphery. The upper capacitor electrode 330a is a constant-potential-side capacitor electrode which is electrically connected to a constant potential source through the capacitor line 330 so that it is maintained at a constant potential. The upper capacitor electrode 330a is formed of a non-transparent metallic film containing, for example, aluminum or silver or an alloy thereof, and also functions also as an upper light-shielding film for the TFT 35.

The lower capacitor electrode 731 is a pixel-potential-side capacitor electrode which is electrically connected to the pixel-electrode-side source drain region 5e of the TFT 35 and the pixel electrode 9a. More specifically, the lower capacitor electrode 731 is electrically connected to the pixel-electrode-side source drain region 5e via the contact hole 89, and to the intermediate layer 93c disposed in the same layer (the fourth layer) as the data lines 6c via the contact hole 85c (see FIG. 12) passing through the second interlayer insulating film 42 and the dielectric film 75. The intermediate layer 93c (see FIG. 12) is electrically connected to the pixel electrode 9a via a contact hole 84c (see FIG. 12) of the third interlayer insulating film 43. That is, the lower capacitor electrode 731 relays the electrical connection between the pixel-electrode-side source drain region 5e and the pixel electrode 9a in cooperation with the intermediate layer 93c. The lower capacitor electrode 731 is made of conductive polysilicon.

As shown in FIGS. 11 and 12, in this embodiment, the storage capacitor 73 is formed so as to cover the contact hole 830. Accordingly, the storage capacitor 73 has a recessed portion along the surface of the recess formed on the upper surface of the first interlayer insulating film 41 because of the contact hole 830. This is substantially the same as the recessed portion 70t of the storage capacitor 70, described in detail in the first embodiment with reference to FIGS. 7 to 9, which is formed along the surface of the recess 710 formed on the upper surface of the first interlayer insulating film 41 because of the contact hole 810.

Structure of Fourth Layer—Data Lines etc.—

Referring to FIG. 13, the data line 6c is formed as a fourth layer. The fourth layer further has the intermediate layer 93c (see FIG. 12) made of the same film as the data line 6c.

As shown in FIGS. 12 and 13, the data line 6c has a main line 6cy extending in the Y direction and an extending portion 6cx extending from the main line 6cy in the X direction. The data line 6c is, in the extending portion 6cx, electrically connected to the data-line-side source drain region 5d of the semiconductor layer 5a through a contact hole 87 that passes through the first interlayer insulating film 41, the dielectric film 75, and the second interlayer insulating film 42.

Referring to FIG. 12, the intermediate layer 93c is disposed in the same layer as the data line 6a (see FIG. 13) on the second interlayer insulating film 42.

Structure of Fifth Layer—Pixel Electrodes etc.—

Referring to FIG. 13, the pixel electrodes 9a are disposed as a fifth layer. The pixel electrodes 9a are formed above the data line 6c, with the third interlayer insulating film 43 therebetween.

As shown in FIGS. 12 and 13, the pixel electrodes 9a are each electrically connected to the pixel-electrode-side source drain region 5e of the semiconductor layer 5a through the lower capacitor electrode 731, the contact holes 89, 84c, and 85c, and the intermediate layer 93c.

The structure of the pixel section described above is common to all the pixel sections, as shown in FIGS. 11 and 12. The image display region 10a (see FIG. 1) has these pixel sections at regular intervals.

Figure 14:
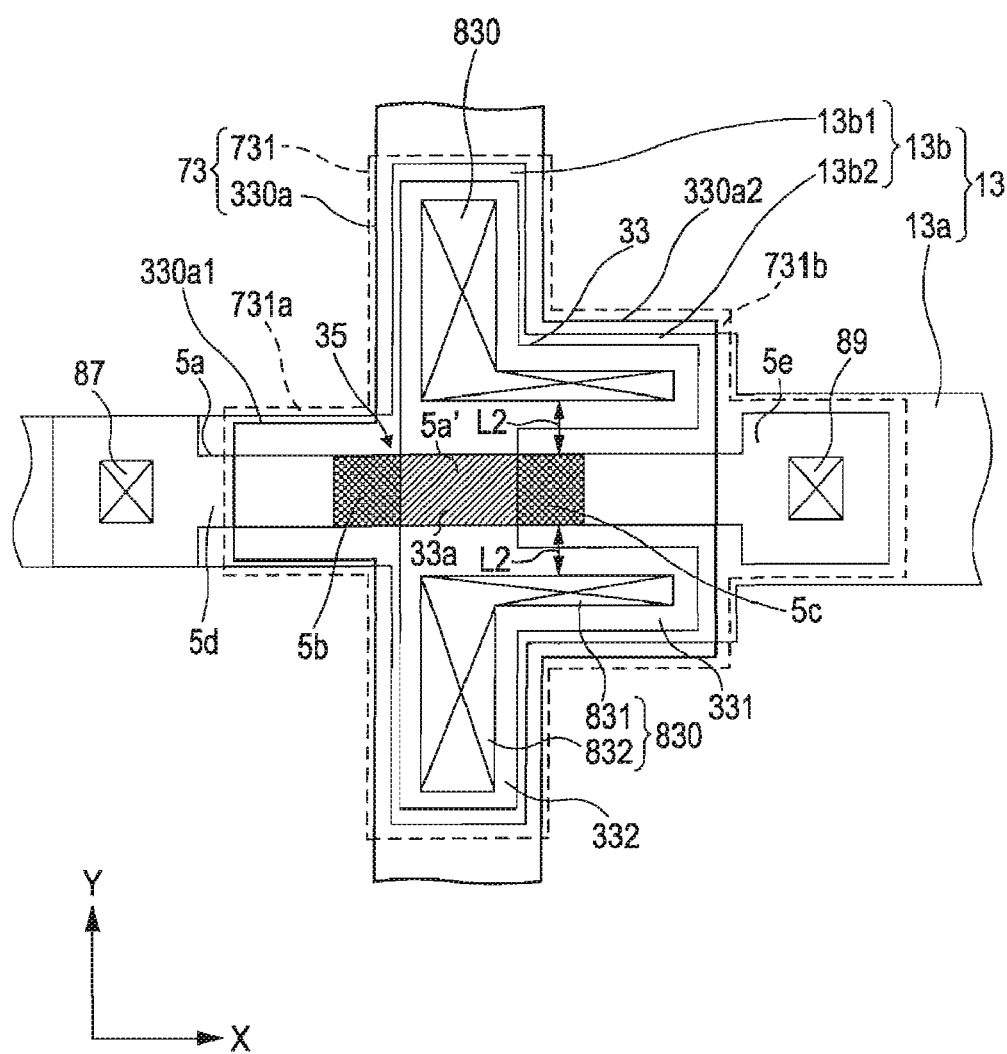
FIG. 14 is a plan view of the third embodiment, similar to FIG. 7.

Referring to FIG. 14, the plan view of the scanning line 13, the gate electrode 33, and the contact hole 830 that electrically connect the scanning line 13 and the gate electrode 33, together with the shape of the storage capacitor 73, will be described.

FIG. 14 is a plan view of the third embodiment, similar to FIG. 7.

In FIG. 14, the scanning line 13 has the main line 13a extending in the X direction and the extending portion 13b extending from the main line 13a in the Y direction, as described with reference to FIG. 11. The extending portion 13b has a portion 13b1 formed so as to overlap with the main line 6cy of the data line 6c and a portion 13b2 adjacent to the pixel-electrode-side LDD region 5c with respect to the data line 6c. The presence of the portion 13b2 adjacent to the pixel-electrode-side LDD region 5c can increase the light shielding effect on the pixel-electrode-side LDD region 5c which is relatively prone to light leakage current, thereby effectively reducing the light leakage current flowing in the TFT 35.

The gate electrode 33 and the scanning line 13 are electrically connected together via the contact hole 830 passing through the gate insulating film 2 and the underlying insulating film 12.

As shown in FIG. 14, particularly in this embodiment, the contact hole 830 has a first portion 831 extending beside the semiconductor layer 5a in the Y direction and a second portion 832 overlapping with part of the main line 6cy of the scanning line 6c and extending in the Y direction. In other words, the contact hole 830 has an L shape in which the first portion 831 and the second portion 832 are connected. As described with reference to FIG. 11, the gate electrode 33 has the main portion 33a overlapping with the channel region 5a' of the TFT 35 and the extending portions 331 and 332 extending from the main portion 33a in such a manner as to overlap with the contact hole 830. The extending portion 331 extends in the X direction so as to cover the first portion 831 of the contact hole 830. The extending portion 332 extends in the Y direction so as to cover the second portion 832 of the contact hole 830. Thus, part of the extending portion 331 is formed in the first portion 831 of the contact hole 830, and is in contact with the scanning line 13 (more specifically, part of the extending portion 13b2). Likewise, part of the extending portion 332 is formed in the second portion 832 of the contact hole 830, and is in contact with the scanning line 13 (more specifically, part of the extending portion 13b1).

This structure can reduce the contact resistance between the gate electrode 33 and the scanning line 13 while maintaining a high open area ratio, substantially as in the first embodiment.

That is, particularly in this embodiment, the contact hole 830 has the first portion 831 and the second portion 832, as described above. Therefore, the area of the contact hole 830 in the limited non-open area can be larger than the case in which the contact, hole 830 has a typical shape in plan view as a general contact hole, such as a circle or a square, or the case in which the contact hole 830 has only one of the first portion 831 and the second portion 832. Thus, the open area ratio can be increased while reducing the electrical resistance between the gate electrode 33 and the scanning line 13.

Furthermore, particularly in this embodiment, the first portion 831 of the contact hole 830 extends beside the semiconductor layer 5a in the X direction. More specifically, the first portion 831 extends longitudinally in the X direction along the side of the semiconductor layer 5a extending in the X direction, with a distance L2 apart therefrom.

Thus, part of the gate electrode 33 formed in the first portion 831 (more accurately, the extending portion 331) is formed as a wall-like light shield extending along the semiconductor layer 5a, as viewed in three dimensions. Thus, the light incident at an angle on the semiconductor layer 5a can be blocked off by the first portion 831 (more accurately, part of the gate electrode 33 formed in the first portion 831). That is, the effect of blocking the light that comes at an angle in the semiconductor layer 5a can be increased by the first portion 831 formed as a wall-like light shield disposed near the semiconductor layer 5a. Thus, the flickering and pixel-to-pixel variations in image display can be reduced.

As shown in FIG. 14, the upper capacitor electrode 330a of the storage capacitor 73 includes a first electrode portion 330a1 which covers the data-line-side LDD region 1b and a second electrode portion 330a2 which covers the pixel-electrode-side LDD region 5c. The lower capacitor electrode 731 of the storage capacitor 73 includes a first electrode portion 731a which covers the data-line-side LDD region 5b and a second electrode portion 731b which covers the pixel-electrode-side LDD region 5c.

Thus, the light that enters the data-line-side LDD region 5b from above can be blocked off by the first electrode portions 330a1 and 731a. The light that enters the pixel-electrode-side LDD region 5c from above can be blocked off by the second electrode portions 330a2 and 731b. Therefore, the generation of light leakage current in the data-line-side LDD region 5b and the pixel-electrode-side LDD region 5c can be reduced.

Particularly in this embodiment, the storage capacitor 73 has the recessed portion which is formed so as to cover the recess formed on the surface of the first interlayer insulating film 41 because of the contact hole 830 and having a recessed cross section along the surface of the recess.

That is, since the underlying insulating film 12 and the gate insulating film 2 disposed lower than the first interlayer insulating film 41 have the contact hole 830, this causes the upper surface of the first interlayer insulating film 41 to have a recess because of the contact hole 813, the recess being substantially along the inner wall of the contact hole 830. The storage capacitor 73 is formed so as to cover the recess, so that part thereof is recessed in the recess to form a recessed portion having a recessed cross section along the surface of the recess. This is substantially the same as the recessed portion 70t of the storage capacitor 70 of the first embodiment, described in detail with reference to FIGS. 7 to 9, which is formed along the surface of the recess 710 formed on the upper surface of the first interlayer insulating film 41 because of the contact hole 810.

Thus, the storage capacitor 73 increases in capacitance by the amount corresponding to the recessed portion. This increases the potential holding characteristic of the pixel electrode 9a. In other words, the storage capacitor 73 having a capacitance to achieve display performance required for the product can be formed in an narrow area on the TFT array substrate 10, as compared with a case in which the storage capacitor 73 has no recessed portion (that is, the storage capacitor 73 has only a flat portion). This can reduce flickering and pixel-to-pixel variations in displaying images, and decrease device size.

Furthermore, since the recess is formed because of the contact hole 830, the recess (and the recessed portion) have substantially the same shape in plan view as the contact hole 830 (not shown). In other words, the recessed portion has, on the TFT array substrate 10 in plan view, a portion extending in the X direction beside the semiconductor layer 5a and a portion overlapping with part of the main line 6cy of the data line 6c and extending in the Y direction. This facilitates forming the recessed portion in the non-open area and can increase the capacitance of the storage capacitor 73 almost without a decrease in open area ratio.

Thus, with the liquid crystal device according to this embodiment, the capacitance of the storage capacitor 73 can be increased and the generation of light leakage current of the TFT 35 can be reduced while maintaining a high open area ratio. This allows high-quality image display.

Electronic Device

An electronic device incorporating the liquid crystal device that is an electrooptic device will be described with reference to FIG. 15.

Figure 15:
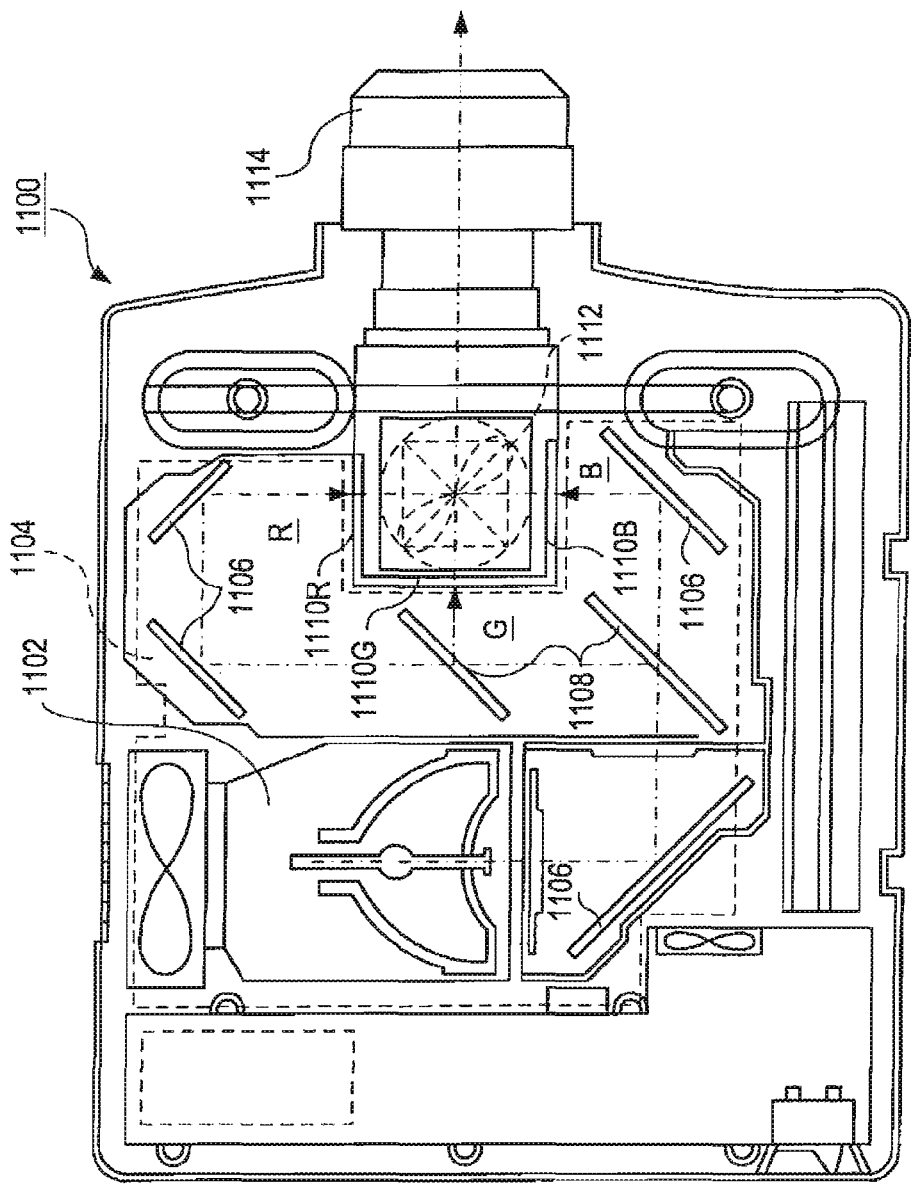
FIG. 15 is a plan view of a projector, an example of an electronic device incorporating the electrooptic device.

FIG. 15 is a plan view of a projector. A projector that uses the liquid crystal device as a light valve will be described hereinbelow.

As shown in FIG. 15, the projector 1100 accommodates a lamp unit 1102 including a white light source such as a halogen lamp. The light emitted from the lamp unit 1102 is separated into the three RGB primary colors of light by four mirrors 1106 and two dichroic mirrors 1108 disposed in a light guide 1104, and enters liquid crystal panels 1110R, 1110G, and 1110B serving as light valves corresponding to the primary colors.

The liquid crystal panels 1110R, 1110G, and 1110B have the same structure as the above-described liquid crystal device, and are driven by RGB primary-color signals applied from an image-signal processing circuit, respectively. The lights modulated by the liquid crystal panels 1110R, 1110G, and 1110B enter a dichroic prism 1112 from three directions. The dichroic prism 1112 refracts R and B lights at 90° and allows G light to go straight. The images of the colors are combined, so that a color image is projected onto a screen or the like through a projection lens 1114.

The display image through the liquid crystal panels 1110R, 1110G, and 1110B will be described herein. The display image through the liquid crystal panel 1110G must be reversed left to right with respect to the display images through the liquid crystal panels 1110R and 1110B.

The liquid crystal panels 1110R, 1110G, and 1110B need no color filter because corresponding RGB primary colors of light come therein by the dichroic mirror 1108.

The electrooptic device according to the embodiments of the invention can be applied not only to the above-described electronic device described with reference to FIG. 15 but also to various electronic devices such as mobile personal computers, portable phones, liquid crystal TVs, viewfinder or monitor-direct-view type videotape recorders, car navigation systems, pagers, electronic notebooks, calculators, word processors, workstations, TV phones, POS terminals, and devices having a touch panel. It is needless to say that the invention can be applied to those electronic devices.

The invention can also be applied to reflective liquid crystal devices that have elements on a silicon substrate (LCOS), plasma displays (PDPs), field-emission displays (FEDs), surface-conduction electron-emitter displays (SEDs), organic EL displays, digital micromirror devices (DMDs), and electrophoresis devices.

The invention may be embodied in other specific forms without departing from the spirit and essential characteristics thereof. The embodiments are therefore illustrative and not restrictive. The scope of the invention is defined by the appended claims rather than by the description. All changes that fall within the bounds of the claims or equivalence of such bounds are therefore intended to be embraced by the claims.

This application is based on Japanese Patent Application No. 2006-338048 filed in Japan Patent Office on Dec. 15, 2006 and Japanese Patent Application No. 2006-338049 filed in Japan Patent Office on Dec. 15, 2006, the contents of which including the specifications, claims, drawings, and abstracts are hereby incorporated by reference.

What is claimed is:

1. An electrooptic device comprising:
a data line and a scanning line intersecting each other;
a pixel electrode corresponding to the intersection of the data line and the scanning line;
a transistor disposed in the intersection area corresponding to the intersection, the transistor including (i) a semiconductor layer having a channel region extending in a first direction in which the data line extends, the semiconductor layer including a first source drain region that is electrically connected to the data line, a second source drain region that is electrically connected to the pixel electrode, a first junction region formed between the channel region and the first source drain region, and a second junction region formed between the channel region and the second source drain region, and (ii) a gate electrode disposed in a layer on the opposite side of the semiconductor layer than the scanning line, the gate electrode overlapping with the channel region; and
a first insulating layer between the semiconductor layer and the scanning line, the first insulating layer having a contact hole for electrically connecting the gate electrode and the scanning line, the contact hole having a first portion located beside the semiconductor layer of the corresponding transistor in plan view and that extends in the first direction along the second junction region and a second portion that overlaps with part of the scanning line and that extends in a second direction that is different from the first direction.

2. The electrooptic device according to claim 1, wherein
the gate electrode has a main portion overlapping with the channel region and a gate-electrode extending portion extending so as to overlap with the contact hole in plan view; and
the scanning line has a main line extending in the second direction and a scanning-line extending portion extending so as to overlap with the first portion in plan view.

3. The electrooptic device according to claim 1, wherein the contact hole is formed on both sides of the semiconductor layer in plan view; and the first portion is provided on both sides of the second junction region.

4. The electrooptic device according to claim 1, wherein the first and second junction regions are LDD regions.

5. The electrooptic device according to claim 1, wherein the scanning line is disposed lower than the semiconductor layer.

6. The electrooptic device according to claim 1, wherein the gate electrode and the scanning line contain a light-shielding conductive material.

7. The electrooptic device according to claim 1, wherein the first portion is smaller in width than the second portion.

8. The electrooptic device according to claim 1, further comprising:
    a storage capacitor disposed higher than the transistor, with a second insulating film therebetween; wherein
    the storage capacitor is formed so as to cover a recess that is formed on the upper surface of the second insulating film because of the contact hole, and has a recessed portion having a recessed cross section along the surface of the recess.

9. The electrooptic device according to claim 8, wherein the storage capacitor overlaps with at least the second junction region in plan view.

10. The electrooptic device according to claim 8, wherein the storage capacitor contains a light-shielding conductive material.

11. The electrooptic device according to claim 9, wherein the storage capacitor extends in the first direction and has a first capacitor portion covering the first junction region and a second capacitor portion covering the second junction region and being wider in the second direction than the first capacitor portion.

12. An electrooptic device comprising:
    a data line and a scanning line intersecting each other;
    a pixel electrode corresponding to the intersection of the data line and the scanning line;
    a transistor disposed in the intersection area corresponding to the intersection, the transistor including (i) a semiconductor layer including a channel region extending in a first direction in which the scanning line extends, a first source drain region that is electrically connected to the data line, a second source drain region that is electrically connected to the pixel electrode, a first junction region formed between the channel region and the first source drain region, and a second junction region formed between the channel region and the second source drain region, and (ii) a gate electrode disposed in a layer on the opposite side of the semiconductor layer than the scanning line, the gate electrode overlapping with the channel region; and
    a first insulating layer between the semiconductor layer and the scanning line, the first insulating layer having a contact hole for electrically connecting the gate electrode and the scanning line, the contact hole having a first portion located beside the semiconductor layer of the corresponding transistor in plan view and that extends in the direction in which the scanning line extends and a second portion that overlaps with part of the corresponding data line and that extends in a direction in which the data line extends, at least one of the first and second portions of the contact hole extending along the second junction region.

13. The electrooptic device according to claim 12, further comprising:
    a storage capacitor disposed higher than the transistor with a second insulating film therebetween; wherein
    the storage capacitor is formed so as to cover a recess that is formed on the upper surface of the second insulating film because of the contact hole, and has a recessed portion having a recessed cross section along the surface of the recess.

14. An electronic device comprising the electrooptic device according claim 1.

15. The electrooptic device according to claim 1, wherein the second portion extends in a direction in which the scanning line extends.

16. The electrooptic device according to claim 1, wherein the first portion extends along the second junction region over the entire length of the second junction region.

17. The electrooptic device according to claim 12, wherein the second portion extends along the second junction region.

18. The electrooptic device according to claim 17, wherein the second portion extends along the second junction region over the entire length of the second junction region.

* * * * *